US010668500B2

(12) United States Patent
Goh et al.

(10) Patent No.: US 10,668,500 B2
(45) Date of Patent: Jun. 2, 2020

(54) AMORPHOUS METAL OXIDE FILMS

(71) Applicant: Agency for Science, Technology and Research, Singapore (SG)

(72) Inventors: Kia Liang Gregory Goh, Singapore (SG); Hong Quang Le, Singapore (SG); Ajay Kumar Kushwaha, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 217 days.

(21) Appl. No.: 15/510,590

(22) PCT Filed: Sep. 10, 2015

(86) PCT No.: PCT/SG2015/050311
§ 371 (c)(1),
(2) Date: Mar. 10, 2017

(87) PCT Pub. No.: WO2016/039693
PCT Pub. Date: Mar. 17, 2016

(65) Prior Publication Data
US 2017/0259300 A1    Sep. 14, 2017

(30) Foreign Application Priority Data
Sep. 11, 2014   (SG) .......................... 10201405657 U

(51) Int. Cl.
*B05D 5/08*   (2006.01)
*C03C 17/25*  (2006.01)
(Continued)

(52) U.S. Cl.
CPC ................ *B05D 5/08* (2013.01); *B05D 1/18* (2013.01); *B05D 3/0272* (2013.01); *B05D 3/104* (2013.01);
(Continued)

(58) Field of Classification Search
CPC ........ B05D 1/18; B05D 3/0272; B05D 3/104; B05D 5/08; C03C 17/25; C03C 17/253;
(Continued)

(56) References Cited

U.S. PATENT DOCUMENTS

2008/0265387 A1* 10/2008 D'Urso ................. B05D 5/083
                                                           257/678

FOREIGN PATENT DOCUMENTS

| JP | 04130017 A | 5/1992 |
| JP | 10158014 A | 6/1998 |

(Continued)

OTHER PUBLICATIONS

Gao et al. "Light-Excited Syperhydrophilicity of Amorphous TiO2 Thin Films Deposited in an Aqueous Peroxotitanate Solution". Langmuir 2004, 20, pp. 3188-3194 (Year: 2004).*
(Continued)

*Primary Examiner* — Alexander M Weddle
(74) *Attorney, Agent, or Firm* — Winstead PC

(57) ABSTRACT

A method for preparing an amorphous metal oxide film is provided. The method comprises providing an aqueous composition comprising a metal fluorine compound; and contacting a substrate with the aqueous composition at a temperature of less than about 100° C. to obtain said amorphous metal oxide film on the substrate. An amorphous metal oxide film, and use of the amorphous metal oxide film in various applications are also provided.

17 Claims, 17 Drawing Sheets

(51) Int. Cl.
*G02B 1/18* (2015.01)
*C03C 23/00* (2006.01)
*B05D 1/18* (2006.01)
*B05D 3/02* (2006.01)
*B05D 3/10* (2006.01)

(52) U.S. Cl.
CPC ............ *C03C 17/25* (2013.01); *C03C 17/253* (2013.01); *C03C 17/256* (2013.01); *C03C 23/0075* (2013.01); *G02B 1/18* (2015.01); *C03C 2217/24* (2013.01); *C03C 2218/111* (2013.01)

(58) Field of Classification Search
CPC ............ C03C 17/256; C03C 2217/24; C03C 2218/111; C03C 23/0075; G02B 1/18
USPC ...................................................... 427/376.2
See application file for complete search history.

(56) References Cited

FOREIGN PATENT DOCUMENTS

| JP | 2006-104541 A | 4/2006 |
|----|---------------|--------|
| JP | 2006176855 A | 7/2006 |

OTHER PUBLICATIONS

Huang et al. "Self-cleaning and antireflection properties of titanium oxide film by liquid phase deposition". Surf. Coat. Technol. (2012), pp. 1-4. (Year: 2012).*

Tsukuma et al. "Liquid phase deposition film of tin oxide". Journal of Non-Crystalline Solids 210 (1997) 48-54 (Year: 1997).*

Gao et al., "Light-Excited Superhydrophilicity of Amorphous TiO2 Thin Films Deposited in an Aqueous Peroxotitanate Solution," Langmuir, vol. 20, No. 8, 2004, pp. 3188-3194.

Huang et al., "Self-Cleaning and Antireflection Properties of Titanium Oxide Film by Liquid Phase Deposition," Surface & Coatings Technology, vol. 231, Sep. 25, 2013, pp. 257-260.

Tsukuma et al., "Liquid Phase Deposition Film of Tin Oxide," Journal of Non-Crystalline Solids, vol. 210, 1997, pp. 48-54.

Shimizu et al., "Creation of High-Refractive-Index Amorphous Titanium Oxide Thin Films from Low-Fractal-Dimension Polymeric Precursors Synthesized by a Sol-Gel Technique with a Hydrazine Monohydrochloride Catalyst," Langmuir, vol. 28, 2012, pp. 12245-12255.

International Preliminary Report on Patentability for International Application No. PCT/SG2015/050311 dated Oct. 26, 2016, pp. 1-14.

Office Action for Japanese Patent Application No. 2017-514288 dated Sep. 3, 2019, pp. 1-9.

* cited by examiner (A)

(B)

(C)

(A)

(B)

(A)

(B)

(C)

(A)

(B)

(A)

(B)

(A)

(B)

(C)

(A)

(B)

(A)

(B)

(C)

AMORPHOUS METAL OXIDE FILMS

CROSS-REFERENCE TO RELATED APPLICATION

This application claims the benefit of priority of Singapore patent application No. 10201405657U filed on 11 Sep. 2014, the content of which is incorporated herein by reference in its entirety for all purposes.

TECHNICAL FIELD

Various embodiments relate to amorphous metal oxide films, and methods for preparing the amorphous metal oxide films.

BACKGROUND

Wettability of a solid surface is important for various commercial applications. When a glass surface gets wet such as in the event of rain, for example, this may result in streaking of the glass surface. Upon drying, the glass surface becomes dirty due to segregation of dirt along the edges of the streaks or droplets as a result of the coffee-ring effect.

To circumvent the above, surface modification to obtain superhydrophilic surfaces having water droplet contact angle smaller than 10° have attracted great attention. The spread of water on superhydrophilic surface coatings may avoid streaking of dirt on surfaces to allow formation of cleaner surfaces. A superhydrophilic surface is useful for many applications involving self-cleaning and anti-fogging. Surfaces such as mirrors, windshields and building windows also require high transmittance in the visible range.

Superhydrophilic surfaces may be obtained using photocatalytically active materials such as titanium dioxide ($TiO_2$), which become superhydrophilic upon illumination of UV light. These superhydrophilic films induced by photocatalytic activity, however, lose their superhydrophilicity a few minutes to hours after removal of the UV irradiation, or after storing in the dark. Furthermore, in case of titanium dioxide, the crystalline titanium dioxide coats may only be applied on surfaces at temperatures above 600° C. (e.g. Pilkington Activ). This limits application of the titanium dioxide coats to only materials that are able to withstand the high temperatures, hence temperature sensitive substrates such as plastics and organic substrates cannot be used. State of the art superhydrophilic films are also not photocatalytically active.

In view of the above, there remains a need for improved films or coatings and method of preparing the films or coatings that overcome or at least alleviate one or more of the above-mentioned problems.

SUMMARY

In a first aspect, a method for preparing an amorphous metal oxide film is provided. The method comprises
 a) providing an aqueous composition comprising a metal fluorine compound; and
 b) contacting a substrate with the aqueous composition at a temperature of less than about 100° C. to obtain said amorphous metal oxide film on the substrate.

In a second aspect, an amorphous metal oxide film prepared by a method according to the first aspect is provided.

In a third aspect, use of an amorphous metal oxide film prepared by a method according to the first aspect in lens, goggles, anti-fouling coatings, self-cleaning surfaces, mirrors, windshields, windows, and covers for cookware is provided.

BRIEF DESCRIPTION OF THE DRAWINGS

The invention will be better understood with reference to the detailed description when considered in conjunction with the non-limiting examples and the accompanying drawings, in which.

Figure 1:
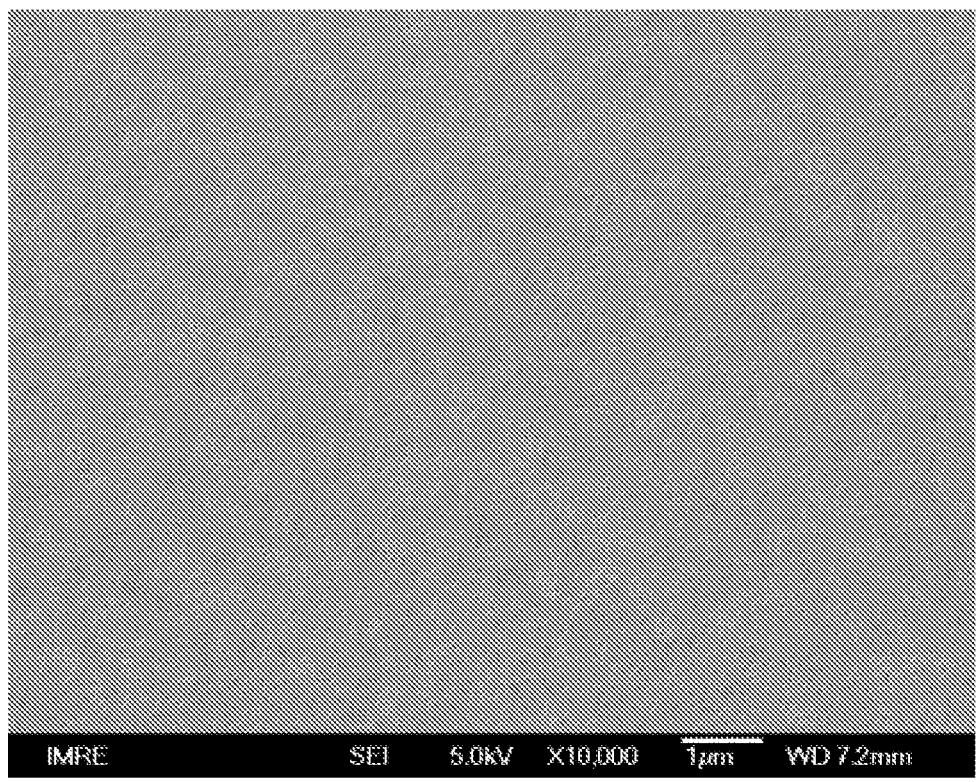
FIG. 1 shows scanning electron microscopy (SEM) images of titanium oxide film deposited at 40° C. on a glass substrate according to an embodiment, where (A) is a low magnification image, (B) is a high magnification image, and (C) is a cross sectional view. Scale bar in (A) denotes 1 µm, while the scale bar in (B) and (C) denotes 100 nm. Results show that the film was nanostructured, and was formed by an island growth mechanism.
Figure 1:
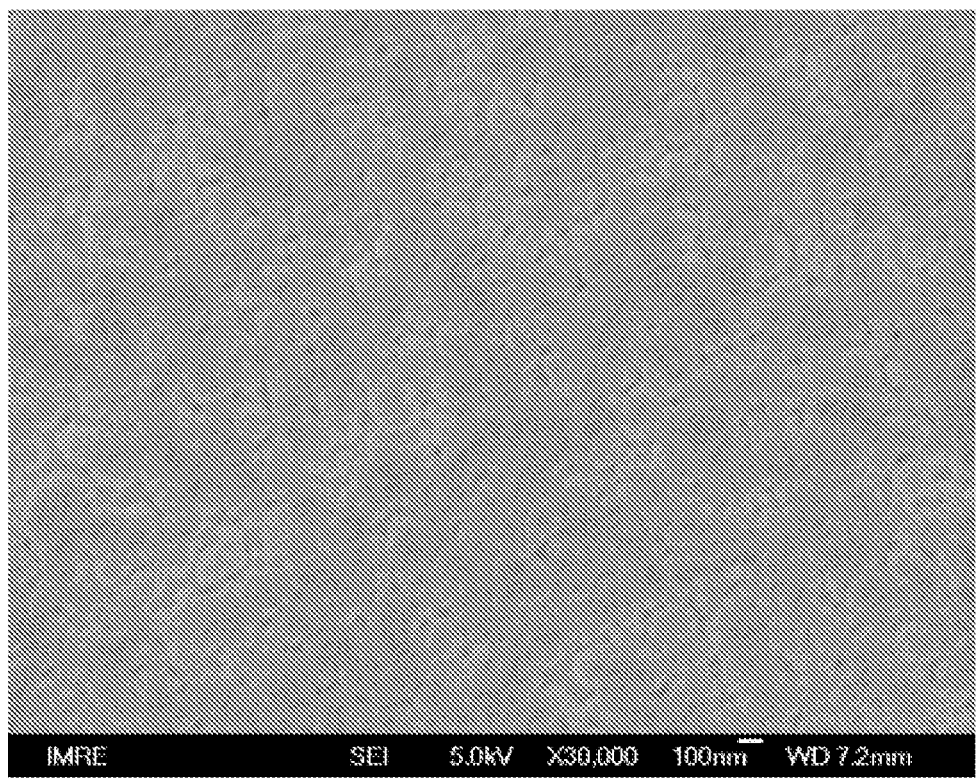
Figure 1:
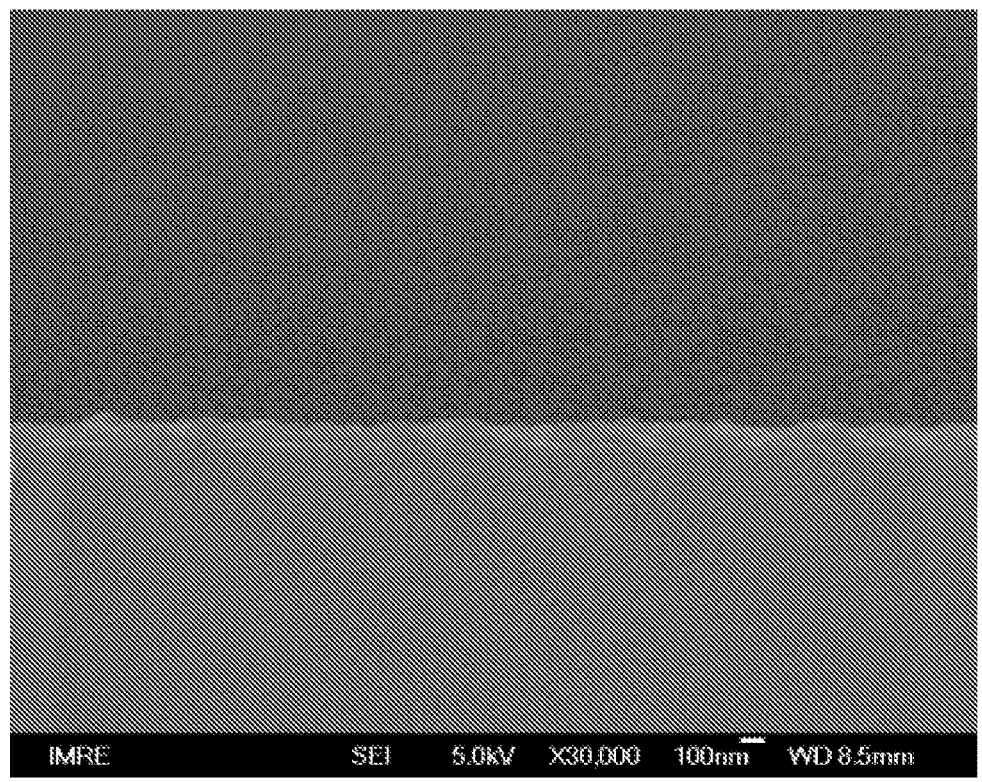
Figure 2:
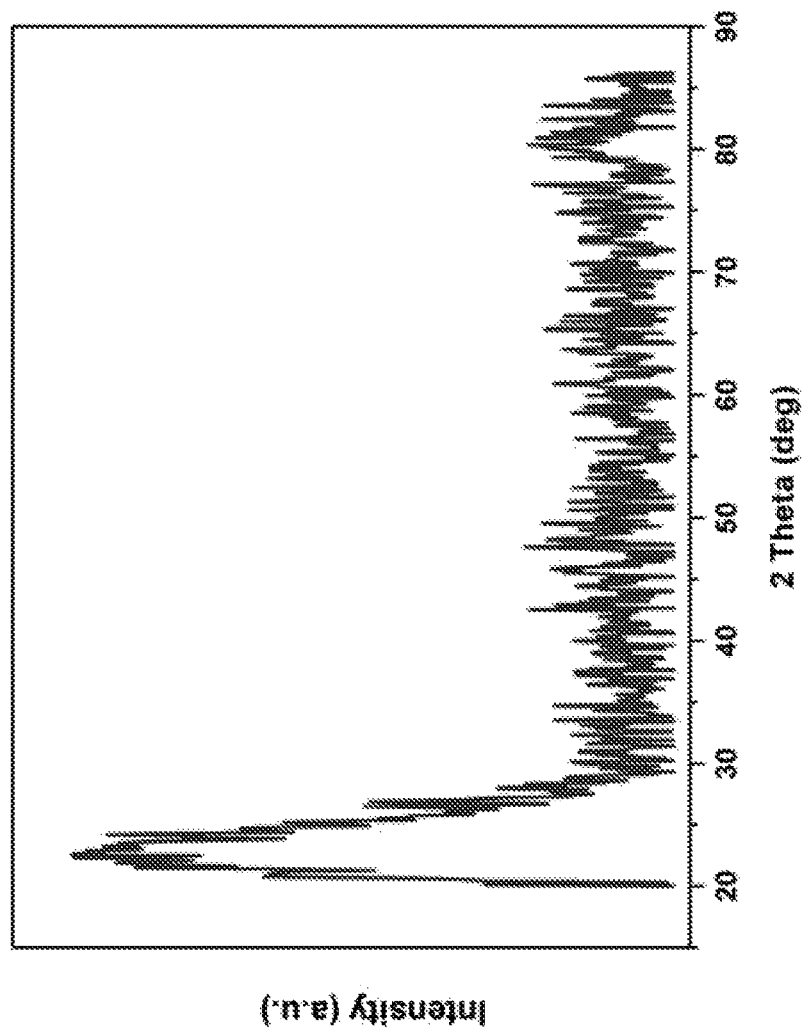
FIG. 2 is a graph showing X-ray diffraction (XRD) result of a titanium oxide film deposited on glass by liquid phase deposition according to an embodiment. Y-axis: intensity (a.u.), and x-axis: 2θ (degrees). Results show that the film was amorphous.

60° C. after 6 hours, (B) 90° C. after 4 hours, and (C) 50° C. after 24 hours using 40 mM $SnF_2$ at pH=7 according to embodiments. Scale bar in the figures denote 100 nm. SEM images show island growth mode of film.

Figure 10:
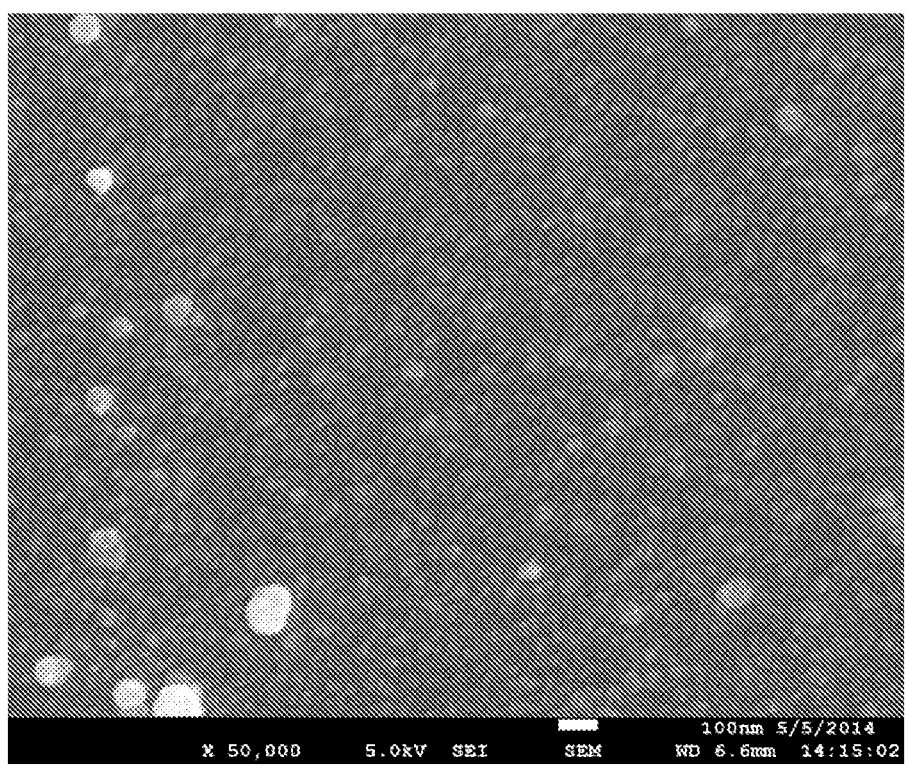
FIG. 10 shows SEM images of tin oxide film deposited on glass using 20 mM $(NH_4)_2SnF_6$ and 80 mM $H_3BO_3$ at (A)
Figure 10:
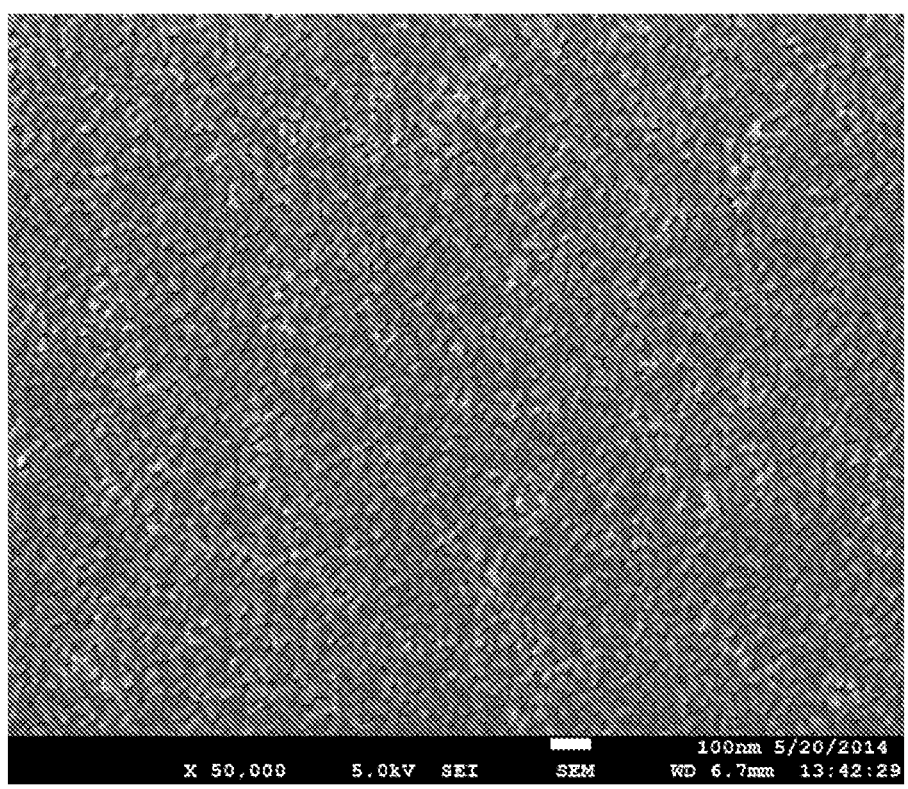
Figure 10:
Figure 11:
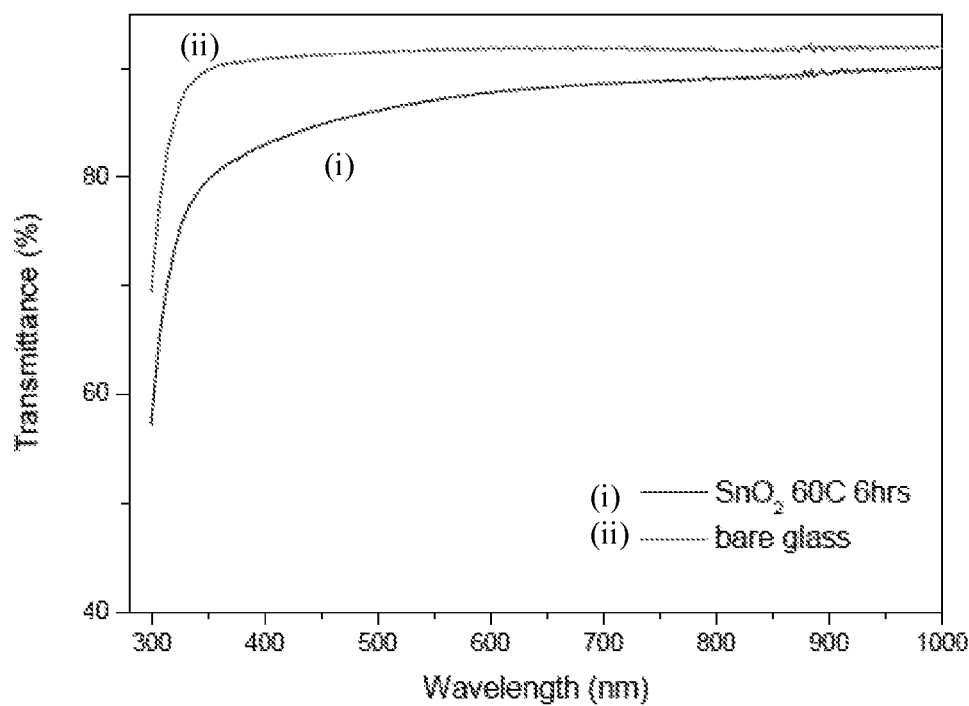
Figure 11:
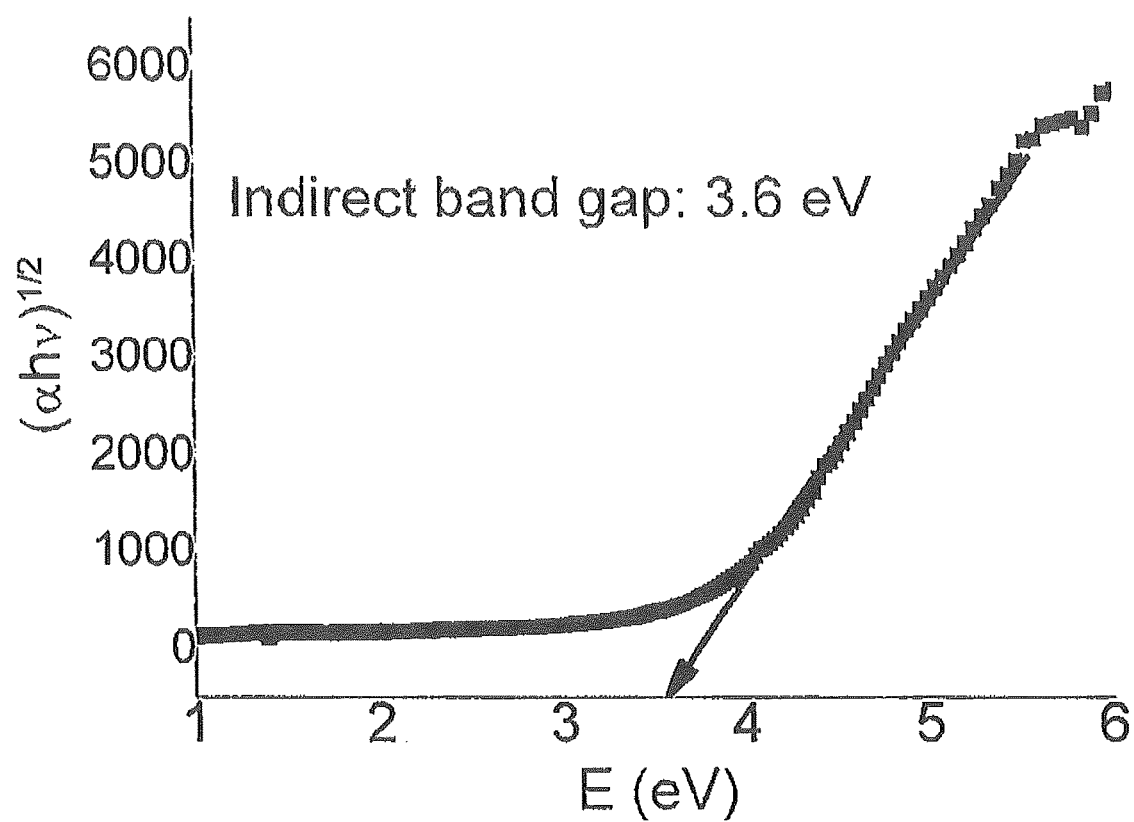

FIG. 11 shows (A) UV-Vis transmittance of tin oxide film in FIGS. 10(A), and (B) its corresponding optical band-gap measurement. For (A), y-axis: transmittance (%), and x-axis: wavelength (nm). For (B), y-axis: $(ahv)^{1/2}$, and x-axis: photon energy E (eV). Results show that the film had transparency greater than 70% and band-gap in the range of 3.6 eV to 3.8 eV (crystalline $SnO_2$ band-gaps 3.5 eV).

Figure 12:
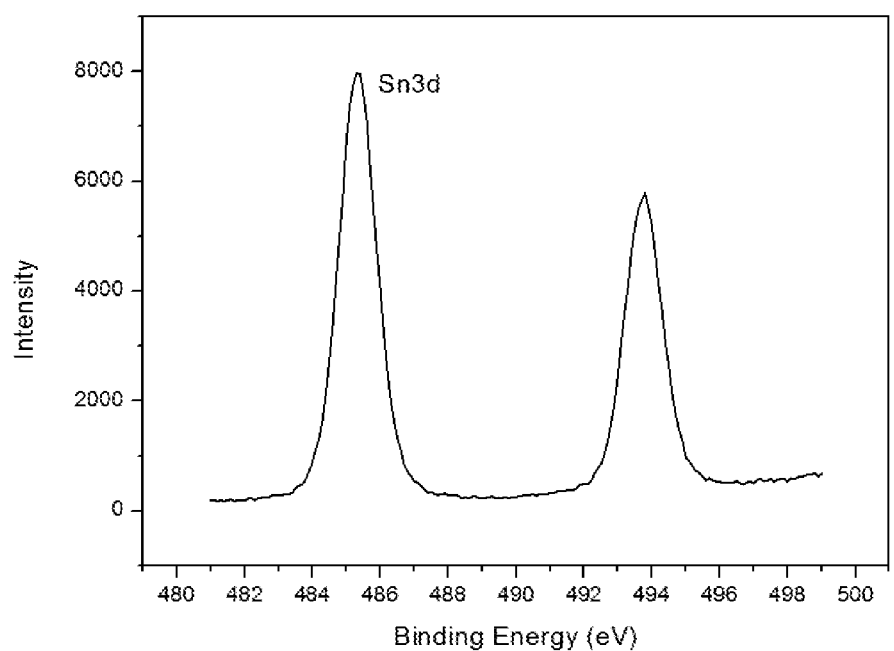
Figure 12:
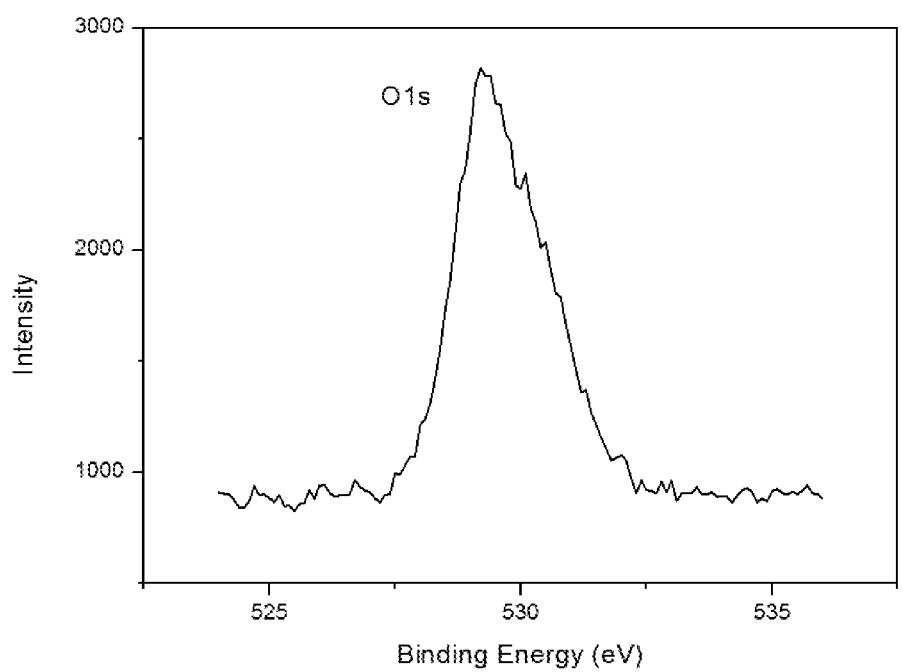
Figure 12:
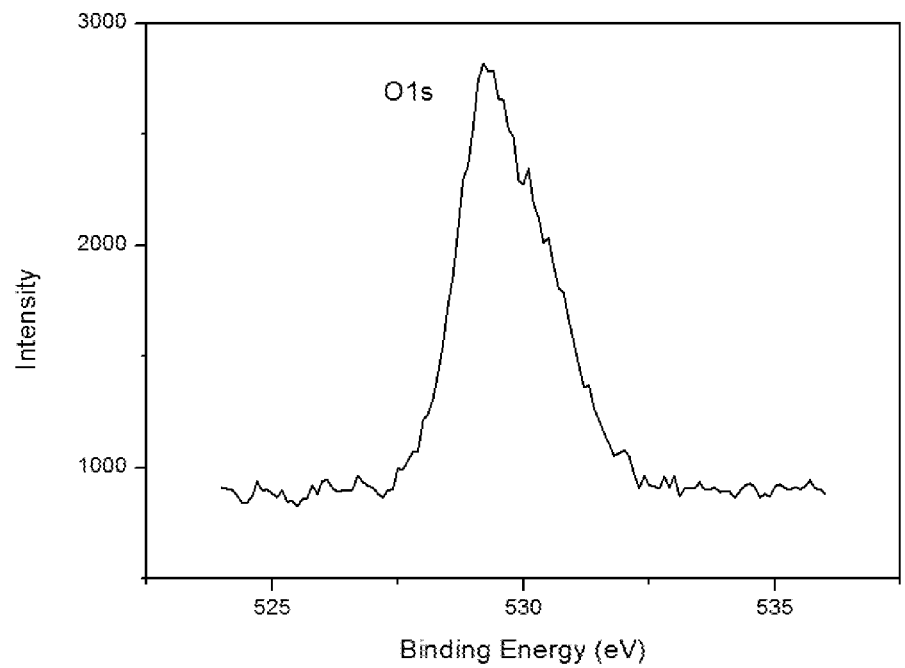

FIG. 12 shows XPS images of a tin oxide film grown at 60° C. for 6 hours with 20 mM $(NH_4)_2SnF_6$, and 80 mM $H_3BO_3$ according to an embodiment, where (A) Sn3d scan, (B) O1s scan, and (C) F1s scan. Results show 31.2 at. % Sn; 65.2 at. % O; and 4.4 at. % F.

Figure 13:
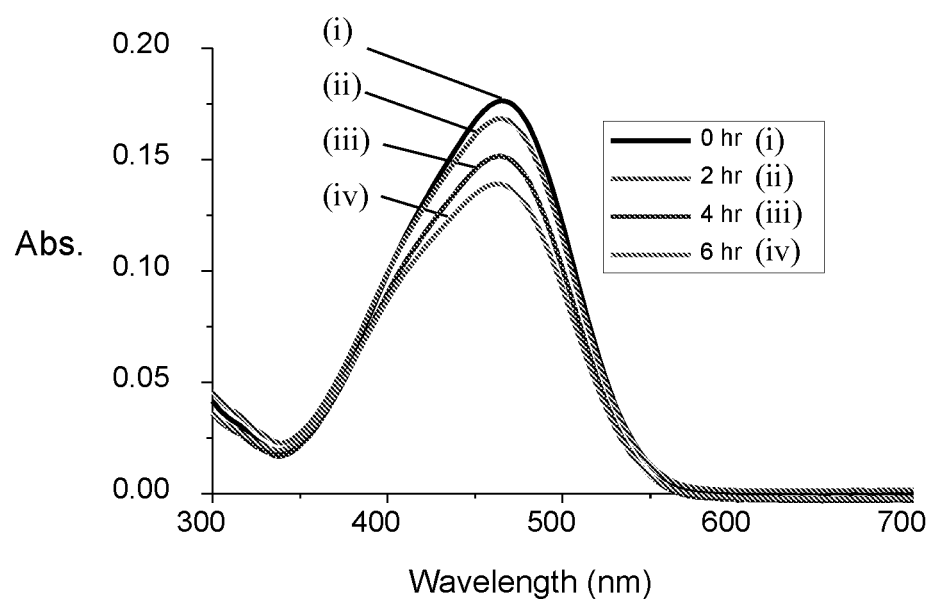

FIG. 13 is a graph showing photodegradation of methyl orange by the amorphous tin oxide film in FIG. 10(A) upon UV activation. Y-axis: absorbance; x-axis: wavelength (nm).

Figure 14:
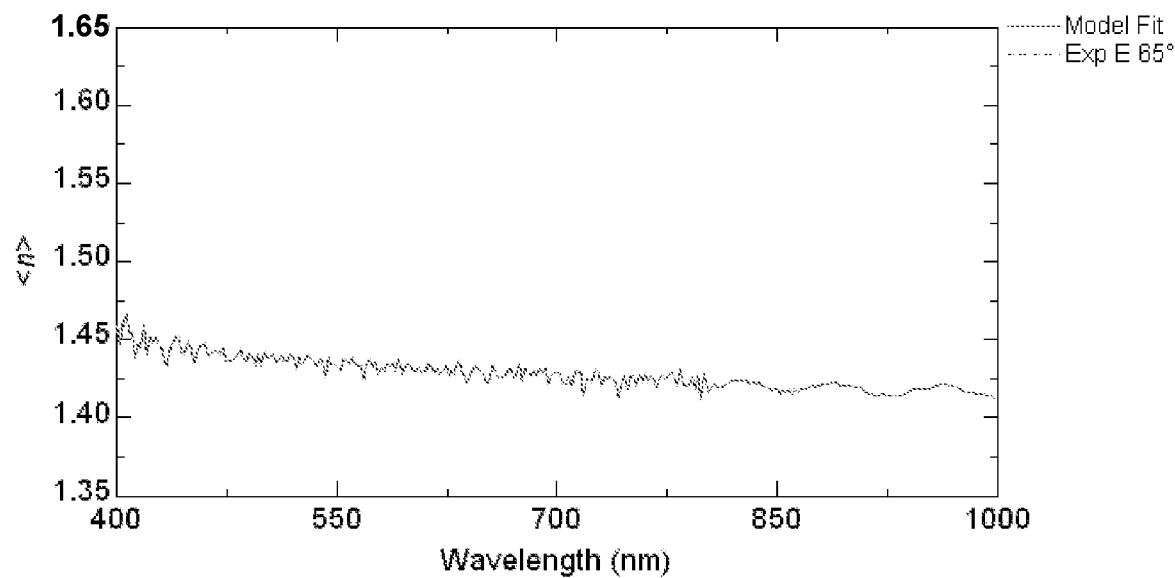

FIG. 14 is a graph showing refractive index of the tin oxide film in FIG. 10(A). Results show that refractive index of the film was close to that of glass. Y-axis: refractive index n, and x-axis: wavelength (nm).

Figure 15:
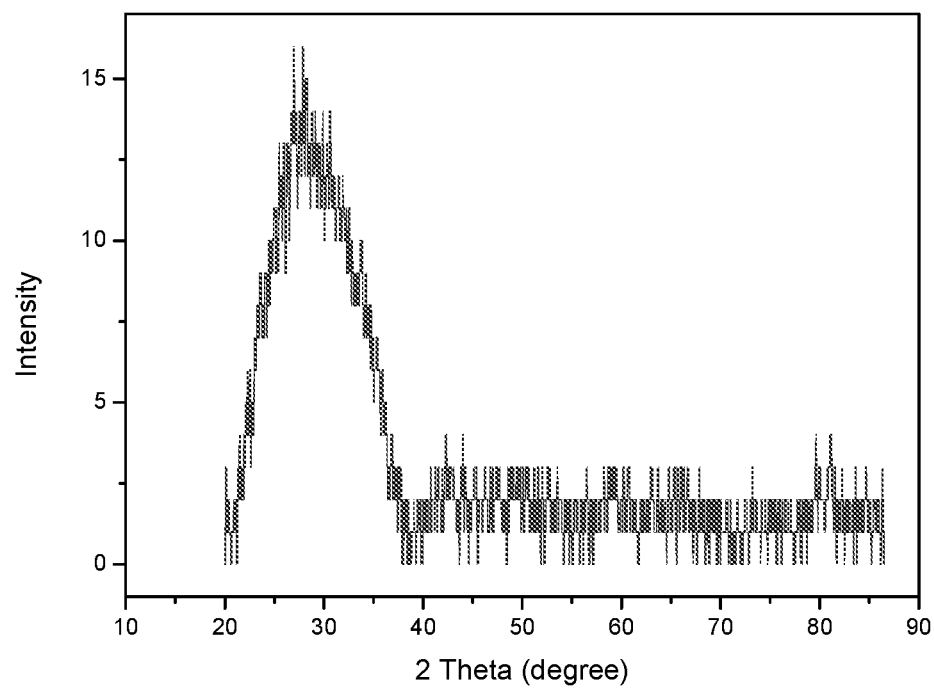

FIG. 15 is a graph showing X-ray diffraction (XRD) result of a tin oxide film according to an embodiment. Y-axis: intensity, and x-axis: 2θ (degrees). Results show that the as-grown film is amorphous.

DETAILED DESCRIPTION

Various embodiments refer in a first aspect to a method for preparing an amorphous metal oxide film.

Advantageously, the amorphous metal oxide films disclosed herein may be obtained using a liquid phase deposition process at low growth temperatures of less than 100° C. This translates into versatility of the preparation method since the amorphous metal oxide films may be formed on any substrate, including heat sensitive surfaces such as polymeric films, plastic and organic substrates or surfaces. Further, methods to prepare the amorphous metal oxide films are simple and may be scaled up easily to large area substrates for batch processing and low cost manufacturing.

The amorphous metal oxide film is multi-functional as it is able to exhibit transparency, superhydrophilicity, and/or photocatalytic activity. For example, the amorphous metal oxide film is suitable for use in various optical applications due to its transparency. The film may also be anti-fogging and ultra-wetting due to its superhydrophilicity. As photocatalytic activation or UV illumination is not required to activate superhydrophilicity of the films, this renders the amorphous metal oxide films suitable for night time and low-light, indoor use. Furthermore, the film may be self-cleaning, odor degrading, and sterilizing due to its photocatalytic activity.

As disclosed herein, a method for preparing an amorphous metal oxide film is provided. The term "amorphous" as used herein refers to a solid material that does not exhibit long-range crystalline order and/or has no substantial crystal lattice structure. In various embodiments, the amorphous metal oxide film is non-crystalline.

Metal of the metal oxide may be titanium (Ti), tin (Sn), and alloys thereof. Accordingly, the amorphous metal oxide film may be an amorphous titanium oxide film, an amorphous tin oxide film, or an amorphous oxide film of a titanium/tin alloy.

In various embodiments, the amorphous metal oxide film contains traces of other elements. For example, titanium and/or tin may be alloyed with silicon (Si), zirconium (Zr), and/or cerium (Ce) to form the amorphous metal oxide film. Advantageously, presence of titanium and/or tin imparts photocatalytic activity to silicon, zirconium, and cerium, which are, by themselves, not photocatalytic.

In a further example, the amorphous metal oxide film may be a fluorine-doped metal oxide film and/or a fluorine-doped metal oxide hydroxide film. By the term "doped", it refers to an additive or element which is added to a material in low concentrations to alter a physical or chemical property of the material.

Amount of fluorine in the fluorine-doped metal oxide film may be in the range of about 4 atomic (at.) % to about 10 at. %, such as about 5 at. % to about 10 at. %, about 6 at. % to about 10 at. %, about 8 at. % to about 10 at. %, about 4 at. % to about 8 at. %, about 6 at. % to about 8 at. %, about 5 at. % to about 8 at. %, or about 7 at. % to about 9 at. %.

In various embodiments, the amorphous metal oxide film may be a fluorine-doped tin oxide film or a fluorine-doped titanium oxide film. In some embodiments, the amorphous metal oxide film may be a fluorine-doped titanium oxide hydroxide (TiOFOH) film.

The method comprises providing an aqueous composition comprising a metal fluorine compound. The metal fluorine compound may be $MF_4$, $MF_2$ or a metal fluorine complex having general formula $A_2MF_6$, wherein M is independently selected from the group consisting of Ti, Sn, and alloys thereof, and A is selected from the group consisting of hydrogen, alkali metal, ammonium group, coordinated water, and combinations thereof.

In various embodiments, M is Ti. The metal fluorine compound may be $TiF_4$, or a metal fluorine complex having formula $A_2TiF_6$, wherein A is selected from the group consisting of hydrogen, alkali metal, ammonium group, coordinated water, and combinations thereof. For example, the metal fluorine compound may be hexafluorotitanic acid, sodium hexafluorotitanate, potassium hexafluorotitanate, or ammonium hexafluorotitanate. In specific embodiments, the metal fluorine compound comprises or consists of ammonium hexafluorotitanate $((NH_4)_2TiF_6)$.

In some embodiments, M is Sn. Accordingly, the metal fluorine compound may be $SnF_2$, $SnF_4$, or a metal fluorine complex having formula $A_2SnF_6$, wherein A is selected from the group consisting of hydrogen, alkali metal, ammonium group, coordinated water, and combinations thereof. For example, the metal fluorine compound may be sodium hexafluorostannate, potassium hexafluorostannate, or ammonium stannifluoride. In specific embodiments, the metal fluorine compound comprises or consists of ammonium stannifluoride $((NH_4)_2SnF_6)$.

In various embodiments, the metal fluorine compound is selected from the group consisting of $SnF_2$, $SnF_4$, $TiF_4$, $(NH_4)_2TiF_6$, $(NH_4)_2SnF_6$, $H_2TiF_6$, $H_2SnF_6$, and combinations thereof.

In some embodiments, the metal fluorine compound is selected from the group consisting of $(NH_4)_2TiF_6$, $SnF_2$, $(NH_4)_2SnF_6$, and combinations thereof.

Concentration of metal fluorine compound in the aqueous composition may be in the range of about 0.01 M to about 0.1 M. For example, concentration of metal fluorine compound in the aqueous composition may be in the range of about 0.03 M to about 0.1 M, about 0.05 M to about 0.1 M, about 0.07 M to about 0.1 M, about 0.01 M to about 0.08 M, about 0.01 M to about 0.06 M, about 0.01 M to about 0.04 M, about 0.02 M to about 0.08 M, about 0.02 M to about 0.06 M, about 0.03 M to about 0.06 M, about 0.02 M, about 0.05 M, about 0.07 M, or about 0.1 M.

Concentration of metal fluorine compound in the aqueous composition may depend on the metal fluorine compound used. For example, in embodiments wherein the metal fluorine compound is $(NH_4)_2TiF_6$, concentration of $(NH_4)_2TiF_6$ in the aqueous composition may be in the range of about 0.08 M to about 0.1 M, such as about 0.1 M. In embodiments wherein the metal fluorine compound is $SnF_2$ or $(NH_4)_2SnF_6$, concentration of $SnF_2$ or $(NH_4)_2SnF_6$ in the aqueous composition may be in the range of about 0.01 M to about 0.04 M, such as about 0.02 M or about 0.04 M.

The aqueous composition may further comprise a fluorine scavenger. As used herein, the term "fluorine scavenger" refers to a compound or element that is capable of capturing fluoride ions in the aqueous composition comprising the metal fluorine compound to precipitate metal oxide. By providing an aqueous composition comprising a metal fluorine compound and a fluorine scavenger, and contacting a substrate with the aqueous composition, an amorphous metal oxide film may be precipitated or deposited on the substrate.

The fluorine scavenger may be selected from the group consisting of boric acid, alkali metal borate, ammonium borate, boron anhydride, boron monoxide, aluminum chloride, metallic aluminum, aluminum oxide, and combinations thereof. In various embodiments, the fluorine scavenger comprises or consists of boric acid.

Concentration of fluorine scavenger in the aqueous composition may be in the range of about 0.06 M to about 0.3 M. For example, concentration of fluorine scavenger in the aqueous composition may be in the range of about 0.08 M to about 0.3 M, about 0.1 M to about 0.3 M, about 0.15 M to about 0.3 M, about 0.2 M to about 0.3 M, about 0.25 M to about 0.3 M, about 0.06 M to about 0.25 M, about 0.06 M to about 0.2 M, about 0.06 M to about 0.15 M, about 0.06 M to about 0.1 M, about 0.06 M, about 0.15 M, about 0.2 M, or about 0.3 M.

In various embodiments, concentration of fluorine scavenger in the aqueous composition depends on the metal fluorine compound and fluorine scavenger used. In embodiments wherein the metal fluorine compound is $(NH_4)_2TiF_6$ and the fluorine scavenger is boric acid, for example, concentration of boric acid in the aqueous composition may be in the range of about 0.2 M to about 0.3 M, such as about 0.3 M. In embodiments wherein the metal fluorine compound is $SnF_2$ and the fluorine scavenger is boric acid, for example, concentration of boric acid in the aqueous composition may be in the range of about 0.06 M to about 0.08 M, such as about 0.06 M. In embodiments wherein the metal fluorine compound is $(NH_4)_2SnF_6$ and the fluorine scavenger is boric acid, concentration of boric acid in the aqueous composition may be in the range of about 0.08 M to about 0.15 M.

In some embodiments, a fluorine scavenger is not used. For example, a substrate may be contacted with an aqueous composition comprising or consisting of $SnF_2$ to precipitate or to deposit an amorphous metal oxide film on the substrate. As an aqueous composition comprising or consisting of $SnF_2$ may have a pH of about 3, thereby rendering the aqueous composition acidic, the mixture may not be suitable for use with pH sensitive substrates or with substrates that are less stable in acidic environments.

As demonstrated herein, an alkaline solution may be added to the aqueous composition containing $SnF_2$, so as to render pH of the composition in the neutral or near neutral range, for example in the pH range of about 5 to about 7, so that pH sensitive substrates or substrates which are less stable in acidic environments may be used. It has been surprisingly found by the inventors that a superhydrophilic film may still be obtained when deposition of the amorphous metal oxide film is carried out at a pH of about 5 to about 7. Examples of suitable alkaline solution may include, but are not limited to, a hydroxide, or an acetate of ammonium, an alkali-metal, and/or an alkaline-earth metal. In specific embodiments, the alkaline solution comprises or consists of sodium hydroxide.

The method for preparing an amorphous metal oxide film comprises contacting a substrate with the aqueous composition at a temperature of less than about 100° C. to obtain said amorphous metal oxide film on the substrate.

The substrate may be of any suitable material, such as glass, metals, ceramics, organic polymer materials, plastics, semiconductors, to name only a few. Further, composites of these materials may also be used as the substrate. In specific embodiments, the substrate is a glass substrate. Shape and structure of the substrate may be arbitrarily selected, and is not limited to a planar surface. For example, the substrate may have a non-planar shape, or be in the form of a product, or a building having a surface onto which the amorphous metal oxide film is to be applied.

Contacting a substrate with the aqueous composition may be carried out by immersing the substrate in the aqueous composition. In various embodiments, the aqueous composition is supersaturated, such that by immersing the substrate in the aqueous composition, this provides a surface onto which the amorphous metal oxide film may be formed.

The amorphous metal oxide film may be precipitated on at least a portion of the substrate that is in contact with the aqueous composition. In various embodiments, the amorphous metal oxide film is precipitated on substantially all of the substrate that is in contact with the aqueous composition.

Rate of formation of metal oxide may be controlled by concentration of and ratio of metal fluorine compound to fluorine scavenger, pH, and temperature, for example.

Referring to the equations in Examples 1.1 and 2.1 disclosed herein, by Le Chatelier's principle, a higher concentration of metal fluorine compound in the form of $[MF_6]^{2-}$ on the left side of the equation results in a faster forward reaction, as this drives the equation to the right. By the same principle, lowering concentration of HF present on the right side of the equation, for example, by increasing concentration of fluorine scavenger such as $H_3BO_3$, drives the equation to the right, resulting in faster formation of metal oxide.

pH, on the other hand, may affect solubility of the target metal oxide. Generally, the lower the solubility of the target metal oxide, the higher the driving force for precipitation.

Temperature may affect rate at which the chemical reactions take place. As mentioned above, use of low growth temperatures of less than 100° C. means that amorphous metal oxide films may be formed on temperature sensitive substrates such as plastic and organic substrates/surfaces.

In various embodiments, contacting a substrate with the aqueous composition is carried out at a temperature in the range of about 40° C. to about 60° C., such as about 45° C. to about 60° C., about 50° C. to about 60° C., about 40° C. to about 55° C., about 40° C. to about 50° C., about 45° C. to about 55° C., about 40° C., about 50° C., or about 60° C. In specific embodiments, contacting a substrate with the aqueous composition is carried out at a temperature of about 40° C. to obtain an amorphous metal oxide film on the substrate.

Contacting a substrate with the aqueous composition may be carried out for any suitable time period that is sufficient to obtain the amorphous metal oxide film. The time period may depend on the metal fluorine compound used, as well as temperature at which the substrate is contacted with the aqueous composition. If lower temperatures are used, for example, a longer contacting time to grow or to form the amorphous metal oxide film may be required. By controlling the contacting time, thickness of amorphous metal oxide film that is formed on the substrate may be controlled.

In various embodiments, contacting a substrate with the aqueous composition is carried out for a time period in the range of about 2 hours to about 24 hours, such as about 4 hours to about 24 hours, about 6 hours to about 24 hours, about 12 hours to about 24 hours, about 18 hours to about 24 hours, about 2 hours to about 18 hours, about 2 hours to about 12 hours, about 2 hours to about 6 hours, about 4 hours to about 18 hours, about 4 hours to about 12 hours, about 2 hours to about 12 hours, about 2 hours to about 8 hours, about 2 hours to about 6 hours, or about 4 hours to about 6 hours.

In some embodiments, the substrate comprises a silicon oxide layer prior to contacting of the substrate with the aqueous composition. For example, the silicon oxide layer may be formed on the substrate prior to forming the amorphous metal oxide film, such that the silicon oxide layer is sandwiched between the substrate and the amorphous metal oxide film. Accordingly, the amorphous metal oxide film may be formed on the silicon oxide layer, whereby the amorphous metal oxide film is in direct contact with the silicon oxide layer. The silicon oxide layer may serve as a buffer or primer layer to improve properties of the amorphous metal oxide film subsequently deposited thereon, such as that discussed in the Examples. The improvement in properties of the amorphous metal oxide film may be seen in terms of improved hydrophilicity or superhydrophilicity of the amorphous metal oxide film, which may result from structure of the amorphous metal oxide film that is formed on the silicon oxide layer.

Generally, the silicon oxide is in the form of silicon dioxide. Advantageously, silicon dioxide possesses excellent chemical stability and good optical transmittance with low refractive index, which renders its suitability in various applications, such as in electronic devices as a passivating layer, and as anti-reflective coatings for display. In various embodiments, the silicon oxide consists essentially of, or consists only of silicon dioxide ($SiO_2$). By the term "consists essentially", this means that the silicon oxide layer may contain trace amounts of other substances, which may arise, for example, from the preparation process. The trace amounts of other substances may be present in an amount of less than 5 atomic %, such as less than 2 atomic %, preferably less than 1 atomic %, even more preferably less than 0.5 atomic %.

The silicon oxide layer may be formed by contacting a substrate with an aqueous composition comprising a fluorine-containing silicon complex and a fluorine scavenger at a temperature of less than 100° C., such as in the range of about 60° C. to about 90° C. Examples of a fluorine-containing silicon complex include hexafluorosilicic acid, ammonium hexafluorosilicate, sodium fluorosilicate, potassium fluorosilicate, and mixtures thereof. Examples of fluorine scavenger have already been discussed above. Concentration of the fluorine-containing silicon complex and the fluorine scavenger in the aqueous composition may respectively be in the range of about 0.02 M to about 0.1 M and about 0.06 M to about 0.3 M.

Contacting a substrate with the aqueous composition comprising fluorine-containing silicon complex and fluorine scavenger may be carried out for any suitable time period that is sufficient to obtain the silicon oxide layer, which may in turn depend on the thickness of the silicon oxide layer to be formed. For example, contacting the substrate with the aqueous composition may be carried out for a time period in the range of about 2 hours to about 12 hours, such as about 2 hours to about 8 hours, about 4 hours to about 8 hours, or about 5 hours to about 7 hours.

In specific embodiments, the substrate comprising the silicon oxide layer is obtained by contacting a substrate with an aqueous composition comprising $(NH_4)_2SiF_6$ and boric acid at a temperature of less than 100° C.

As mentioned above, the amorphous metal oxide film is able to exhibit superhydrophilicity without requiring activation by UV excitation. As used herein, the term "superhydrophilic" refers to an attribute of a substrate whereby contact angle between a water droplet and a surface of the substrate is smaller than about 10°. For example, contact angle of the superhydrophilic coating disclosed herein may be smaller than 10°, such as smaller than 8°, smaller than 6°, or smaller than 5°. This distinguishes from state of the art methods for preparing superhydrophilic coatings containing titanium oxide where photocatalytic activation or UV excitation is required. Removal of requirements for UV excitation translates into possible applications of the amorphous metal oxide films disclosed herein for night time and indoor use.

The amorphous metal oxide film prepared by a method disclosed herein may consist essentially of metal oxide islands. As used herein, the term "island" refers to a distinct area of a layer having a defined geometric shape that is protruding from the layer. In various embodiments, the amorphous metal oxide film is formed by an island growth mechanism, where the metal oxide islands on the substrate are capable of coalescing to form a continuous film.

Superhydrophilicity of the amorphous metal oxide film disclosed herein may be due to porous nature of the film. In various embodiments, the amorphous metal oxide film is mesoporous. According to IUPAC definition, mesopores have a size of between about 2 nm to about 50 nm. The mesopores may be defined by the metal oxide islands, and be present in the form of spacing between the islands. Advantageously, the amorphous metal oxide film is highly transparent and superhydrophilic as-grown, meaning that post growth heat treatment is not required.

The amorphous metal oxide film may exhibit a transmittance of at least 80% in the wavelength region from 350 nm to 750 nm. The term "transmittance" as used herein refers to intensity of radiation transmitted through a material over that of the incident radiation, and which is expressed as a percentage. The wavelength region from 350 nm to 750 nm corresponds to visible light range of the electromagnetic spectrum. In various embodiments, the coating exhibits a transmittance of at least 80%, at least 85%, at least 87%, or at least 90% in the wavelength region from 350 nm to 750 nm.

Optical band-gap of the amorphous metal oxide film may be greater than 3.2 eV. The term "band-gap" as used herein refers to a difference in energy between the top of the valence band to the bottom of the conduction band of a material, which amounts to the minimum amount of energy for an electron to jump or transition from a valence band to a conduction band. The term "optical band-gap" refers to photons assisting the electrons to move from valence band to conduction band, which is important as it determines the portion of the electromagnetic spectrum a material absorbs.

In various embodiments, optical band-gap of the amorphous metal oxide film is in the range of about 3.2 eV to about 3.8 eV, such as about 3.3 eV to about 3.8 eV, about 3.4 eV to about 3.8 eV, or about 3.6 eV to about 3.8 eV. In various embodiments, optical band-gap of the amorphous metal oxide film is in the range of about 3.4 eV to about 3.8 eV.

Advantageously, optical band-gap of the amorphous metal oxide film may be greater than the optical band-gap of conventional crystalline $TiO_2$ films and particles used as self-cleaning coatings on surfaces inside a building, where their band-gap may be in the range of about 3 eV to about 3.2 eV. In applications where the amorphous metal oxide film disclosed herein is used as coatings on windows of buildings for example, light or sunlight are able to pass through the amorphous metal oxide coated windows to activate the crystalline $TiO_2$ films and particles inside the buildings, so as to activate their self-cleaning properties.

The amorphous metal oxide film may have a refractive index that is close to that of a glass substrate. Advantageously, this index matching feature may mean that the amorphous metal oxide film does not impart a tint to the coated substrate, thereby providing improved flexibility in architectural design.

As mentioned above, the amorphous metal oxide film may be photocatalytically active. As used herein, the term "photocatalytically active" refers to ability of a material to exhibit catalytic activity upon irradiation with light such as ultraviolet rays, and preferably, to ability of a material to degrade various organic and inorganic compounds by utilizing oxidation power induced by ultraviolet light (electromagnetic radiation with a wavelength between 100 and 400 nm) and/or visible light (electromagnetic radiation with a wavelength between 400 and 760 nm) energy. Advantageously, by coating a surface with an amorphous metal oxide film disclosed herein, organic compounds such as methyl orange and methylene blue, or stains that may be present on the surface may be degraded by irradiating UV light on the surface due to photocatalytic activity of the amorphous metal oxide film. In so doing, this may serve to sterilize a surface having the amorphous metal oxide film coated thereon.

Various embodiments refer in a second aspect to an amorphous metal oxide film prepared by a method according to the first aspect. As mentioned above, the amorphous metal oxide film may be mesoporous. The amorphous metal oxide film may exhibit a transmittance of at least 80% in the wavelength region from 350 nm to 750 nm.

In various embodiments, the amorphous metal oxide film has a substantially uniform thickness. Different thickness of the amorphous metal oxide film may be obtained by controlling contact time of the substrate with the aqueous composition. Generally, a longer contact time results in a thicker film.

For example, thickness of the amorphous metal oxide film may be in the range of about 100 nm to about 600 nm, such as about 150 nm to about 600 nm, about 200 nm to about 600 nm, about 300 nm to about 600 nm, about 400 nm to about 600 nm, about 500 nm to about 600 nm, about 100 nm to about 500 nm, about 100 nm to about 400 nm, about 100 nm to about 300 nm, about 100 nm to about 200 nm, about 200 nm to about 400 nm, about 250 nm to about 450 nm, or about 300 nm to about 400 nm.

Various embodiments refer in a third aspect to use of an amorphous metal oxide film prepared by a method according to the first aspect in buildings, lens, goggles, anti-fouling coatings, self-cleaning surfaces, mirrors, windshields, windows, and covers for cookware.

In various embodiments, the amorphous metal oxide film is able to attract water instead of repelling it. This creates a layer of water that prevents fogging on glass or plastic surfaces, and keeps surfaces cleaner for a longer period of time. Coating building exteriors with the amorphous metal oxide film, for example, allows for self-cleaning during rain. Advantageously, due to its superhydrophilic nature, the amorphous metal oxide film creates an additional uniform water layer to produce a better view as opposed to water-repelling technologies that form water droplets which impair vision. This renders the amorphous metal oxide films disclosed herein particularly suitable for applying on surfaces of minors, windshields and building windows, which require high transmittance in the visible range.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

As used herein, the term "and/or" includes any and all combinations of one or more of the associated listed items. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Example 1: TiOFOH Film

Various embodiments relate to a method of preparing a titanium oxide fluoride hydroxide (TiOFOH) film. The as-grown film prepared by the method is transparent, porous, amorphous, superhydrophilic, and photocatalytically active. To-date, use of amorphous TiOFOH film for photocatalyses has not been reported, and it is the understanding that titanate film in the crystalline phase is required for photocatalytic activity.

The film disclosed herein may be applied on transparent surfaces. Coatings utilizing $TiO_2$ have been called self-cleaning coatings and are based on the crystalline form of $TiO_2$ known as anatase. The present TiOFOH films are amorphous but yet photocatalytically active. Therefore, a multifunctional film that is anti-fogging, self cleaning, ultrawetting, odour degrading, oxidizing to organic material, while at the same time transparent, has been disclosed herein.

Advantageously, the film was superhydrophilic as-grown due to its porous nature and required no post growth heat treatment and was thus amorphous. Despite this, the film was photocatalytically active presumably because the film porosity allowed sufficient electrons and holes generated by UV irradiation to escape to a surface before they recombined due to the dangling bonds in an amorphous matrix.

Commercially available $TiO_2$ coatings are only superhydrophilic when irradiated with UV light. The films disclosed herein are superhydrophilic even without UV irradiation due to their porous structure, and are therefore more efficient with regard to self cleaning. The photocatalytic ability also means the film may be used to degrade odours and organic stains.

Just as important is the fact that the optical band-gap of the present films, 3.45 eV, is larger than the band-gap of $TiO_2$ (ZnO) films and particles, 3.2 eV (3 eV) used on surfaces in a building. Upon irradiating an amorphous TiOFOH coated glass window with, for example, light or sunlight, residual UV radiation (less than 3.45 eV) which is not absorbed by the coating may be used to activate crystalline $TiO_2$ placed or located in the building.

This stands in contrast to state of the art films, where crystalline anatase $TiO_2$ is used as a self cleaning coating for windows, as the crystalline anatase $TiO_2$ having band-gap of 3.2 eV will absorb all UV radiation and prevent the activation of crystalline anatase located after this layer (e.g. inside the building). Even though a very thin layer of anatase $TiO_2$ can be used so that not all UV radiation is absorbed, this reduces the photodegradation efficiency of the anatase layer and is therefore undesirable. The same applies in the case of crystalline rutile $TiO_2$ where band-gap is 3 eV.

Example 1.1: Preparation of TiOFOH Film

The method utilized may be termed liquid phase deposition (LPD) and the amorphous film may be deposited from solution onto glass substrates at growth temperatures less than 100° C. (preferably 40° C.). Since only a maximum processing temperature of 40° C. is required, superhydrophilic and self cleaning films may be deposited on polymers and organics. As a photocatalytically active material is utilized, additional properties such as odor reduction and stain removal may be introduced. Furthermore, the superhydrophilic properties do not require UV activation.

Generally, the LPD process may include slow hydrolysis of metal fluorine complex $[MF_n]_{m-n}$ with boric acid as an example of a fluorine scavenger. The reaction may be conducted in a supersaturated chemical solution in which the substrate is simply immersed. The fluoride ligand offers a slower and more controllable hydrolysis via control of the boric acid concentration as it acts as a F-scavenger.

To deposit films on glass, the glass was first washed with piranha solution and DI water. The freshly prepared aqueous solution comprised of 0.10 M $(NH_4)_2TiF_6$ (AHFT) and 0.30 M $H_3BO_3$. A glass slide was then suspended face down inside the deposition solution with the backside fully covered with a piece of Teflon tape. The sealed container was placed in a convection oven at 40° C. for 2 hours to conduct the reaction. The resulting films were then washed with DI water and blown dry.

Film was formed (40° C. growth temperature) according to the following equations:

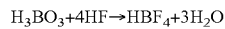

Rate of film formation may be controlled by temperature, pH, concentration and $AHFT/H_3BO_3$ ratio. The method is simple and scalable.

Example 1.2: Characterization of TiOFOH Film

Figure 3:
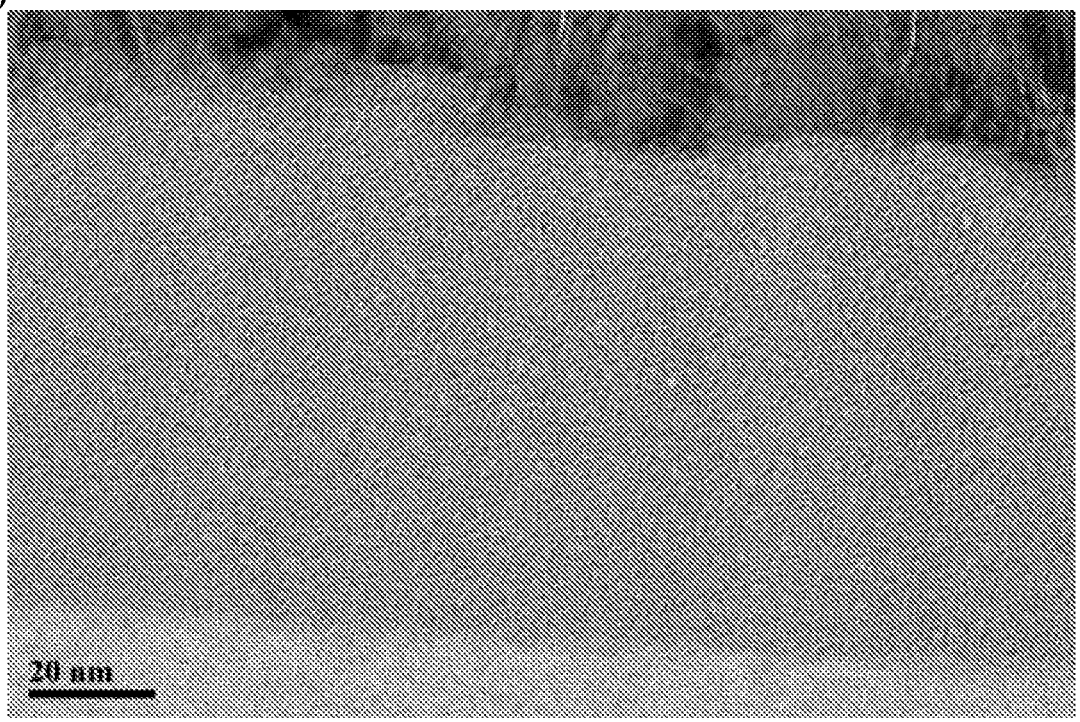
FIG. 3 shows transmission electron microscopy (TEM) images of a titanium oxide film deposited on a glass substrate according to an embodiment, where (A) is a low magnification image showing pores, and (B) is a higher magnification image showing amorphous nature of film. Scale bar in (A) and (B) denotes 20 nm and 10 nm, respectively. Results show that film was amorphous and porous.
Figure 3:
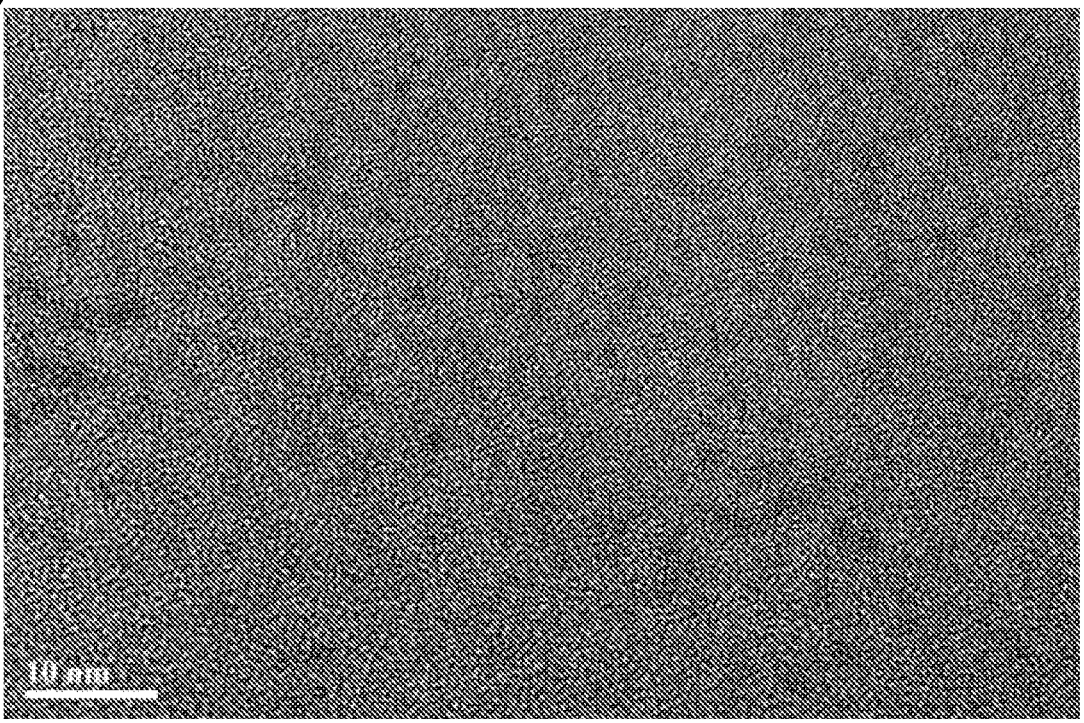
Figure 4:
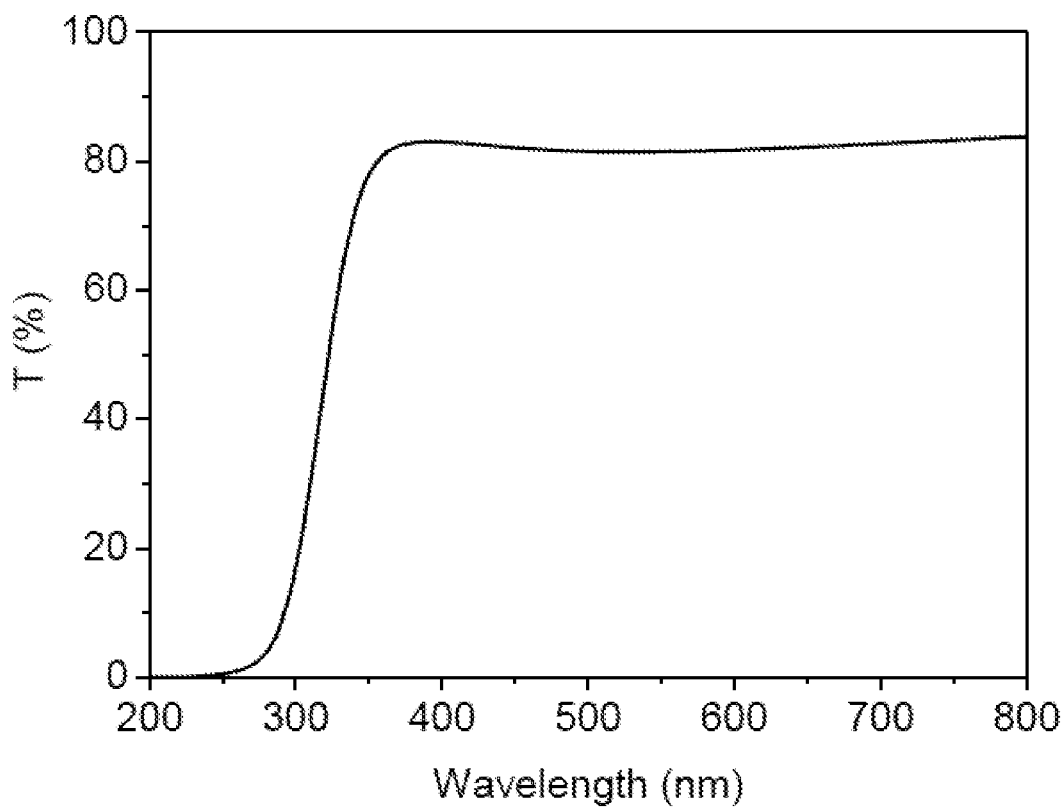
FIG. 4 is a graph showing UV-Vis transmittance of a titanium oxide film deposited on a glass substrate according to an embodiment. Y-axis: transmittance, T (%), and x-axis: wavelength (nm). Results show that the film demonstrated transparency greater than 80%.

X-ray diffraction shows that the film is amorphous. This is further confirmed by TEM (FIG. 3(B)) which shows only amorphous material and no lattice fringes. TEM (FIG. 3(A)) also shows that the film is porous. UV-Vis transmission (FIG. 4) shows that the porous film is also transparent.

Figure 5:
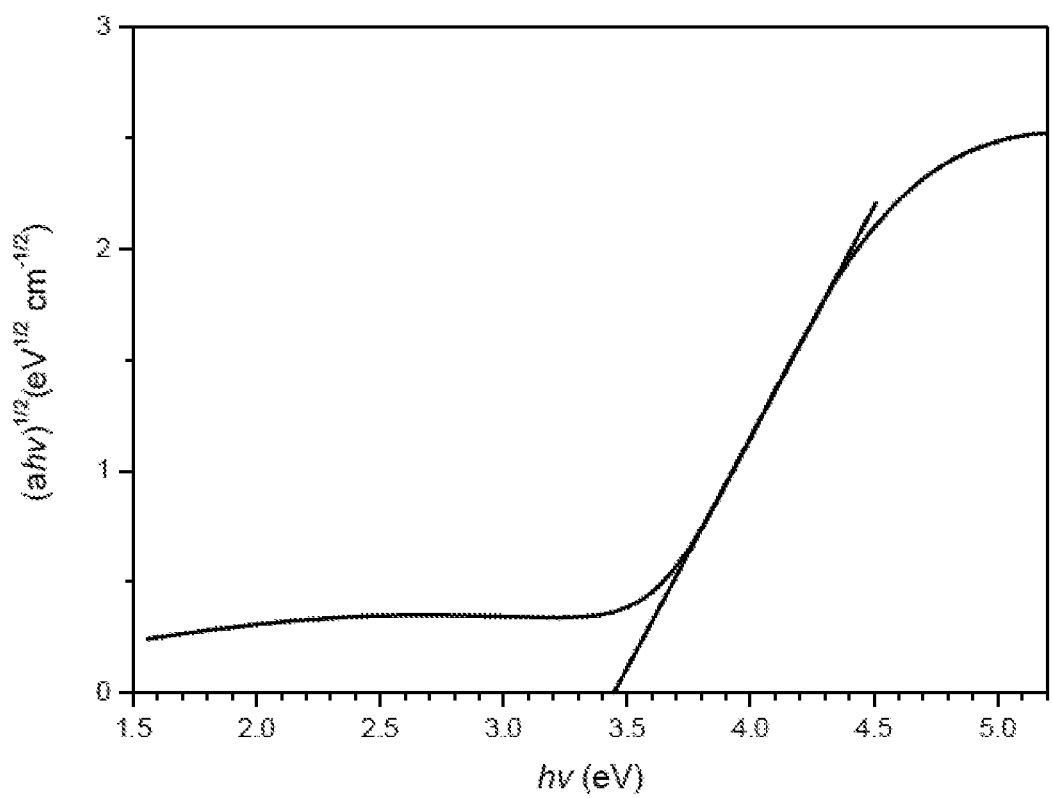
FIG. 5 is a graph showing optical band-gap measurement of a titanium oxide film deposited on a glass substrate according to an embodiment. Y-axis: $(ahv)^{1/2}(eV^{1/2}\, cm^{-1/2})$, and x-axis: photon energy, hv (eV). Results show that optical band-gap of the film was about 3.45 eV.

Optical band-gap measurements of the film reveal a band-gap of 3.45 eV, as shown in FIG. 5. The optical band-gap of anatase is 3.2 eV, so this provided confirmation that the film was different from titania.

Figure 6:
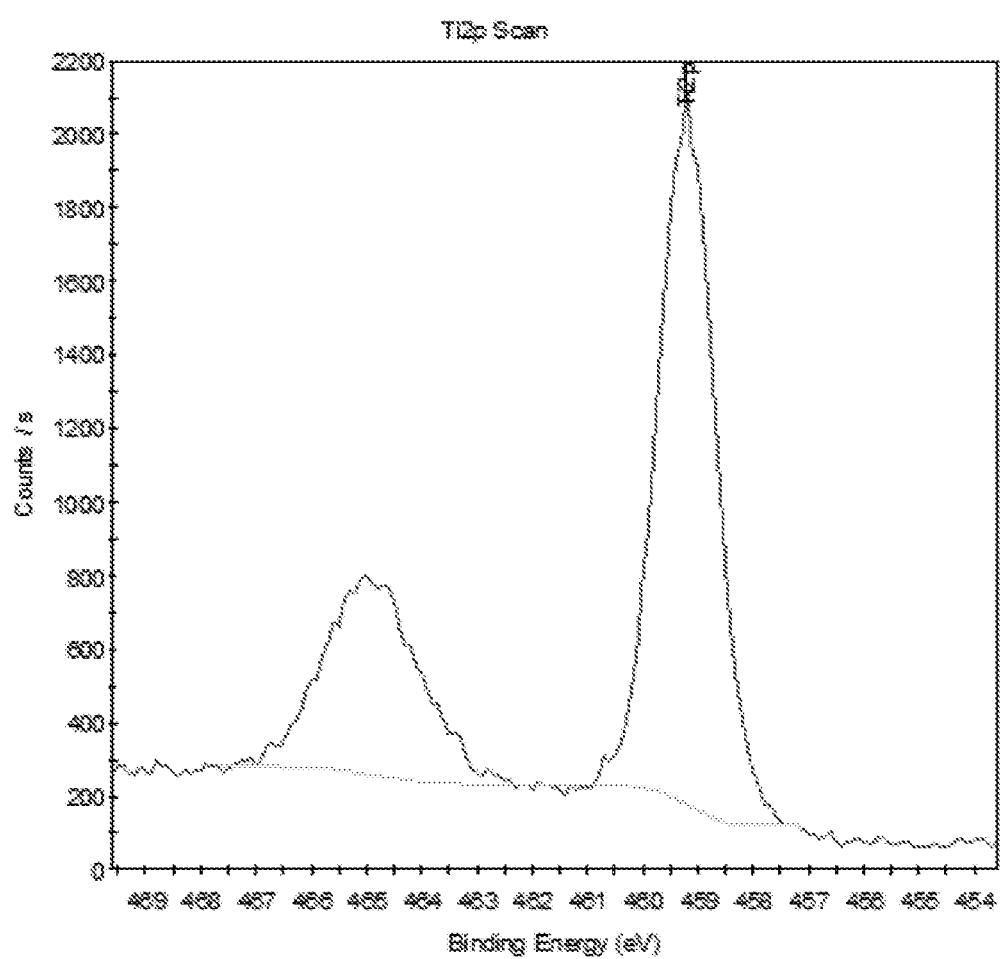
FIG. 6 shows X-ray photoelectron spectroscopy (XPS) scans of (A) Ti2p scan, (B) O1s scan, and (C) F1s scan, of a titanium oxide film according to an embodiment. Results show 23.4% Ti, 61.1% O, 8.1% F, and 7.6% shoulder O associated with OH. In the embodiment shown, the film may be a titanium oxide fluoride hydroxide (TiOFOH) film.
Figure 6:
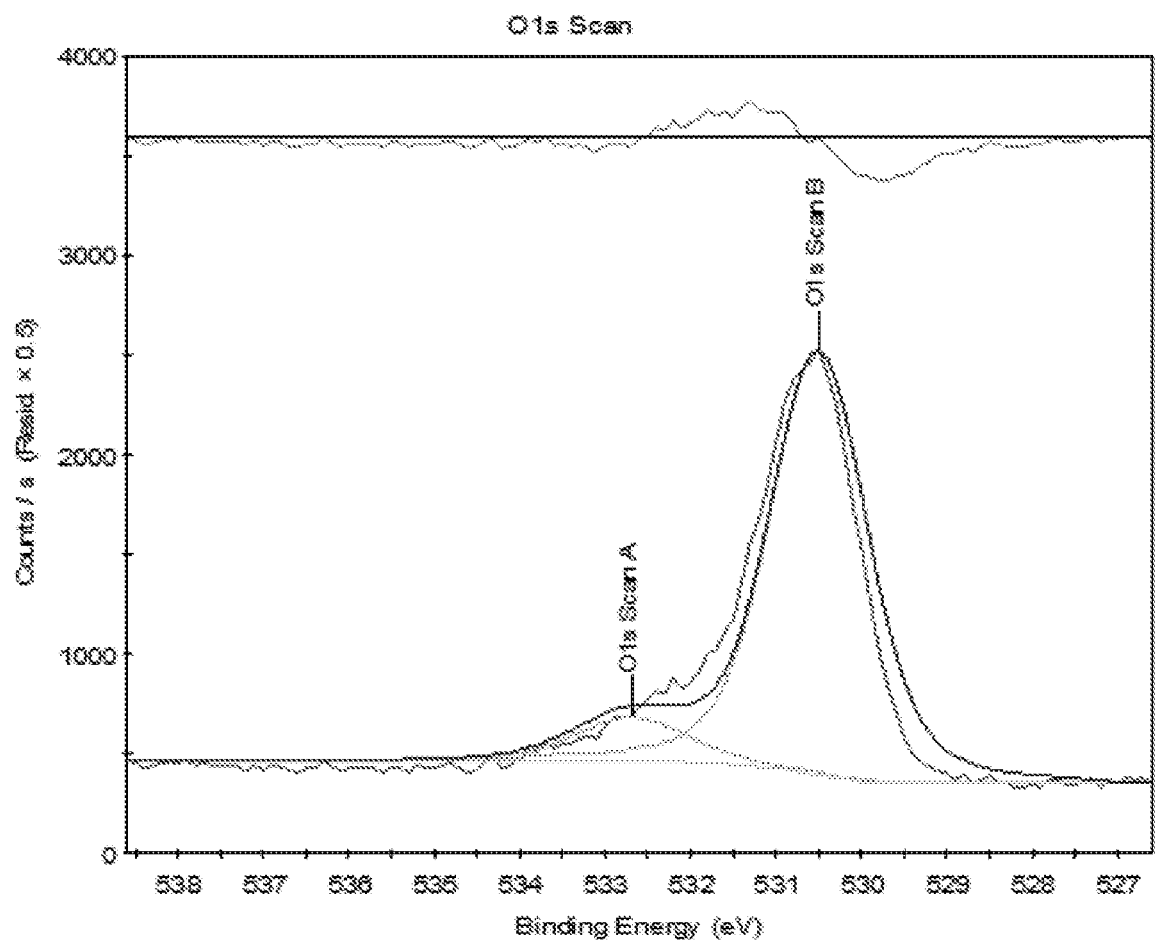
Figure 6:
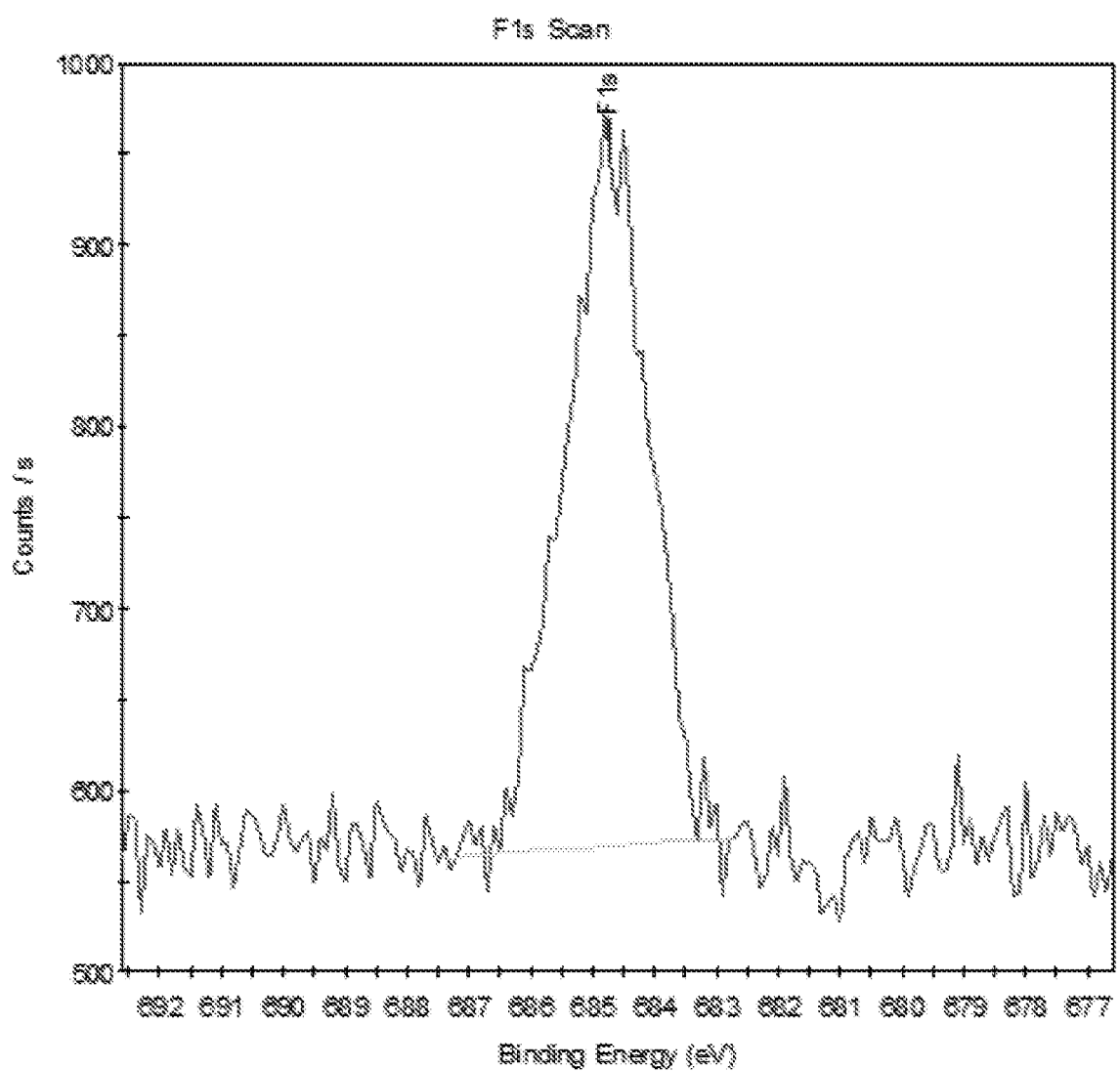

X-ray photoelectron spectroscopy (XPS) in FIG. 6 revealed that the film was composed of Ti, O and F. But a closer look at the O1s peak reveals a shoulder which was related to hydroxyl groups (OH). The atomic percentages for Ti, O, F and OH were found to be 23.4%, 61.1%, 8.1%, and 7.6% respectively. This film was termed by the inventors as TiOFOH.

Figure 7:
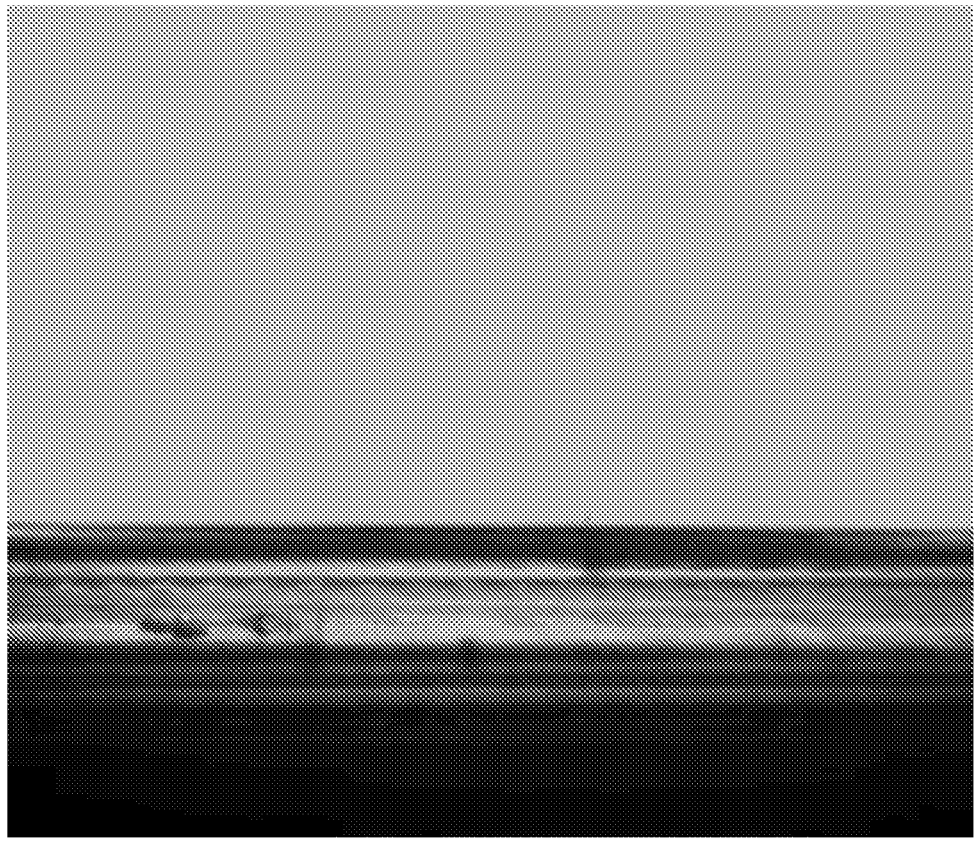
FIG. 7 shows water contact angle measurements of (A) as-grown titanium oxide film displaying superhydrophilicity of less than 5°, and (B) titanium oxide film after 3 months with contact angle of about 81°.
Figure 7:
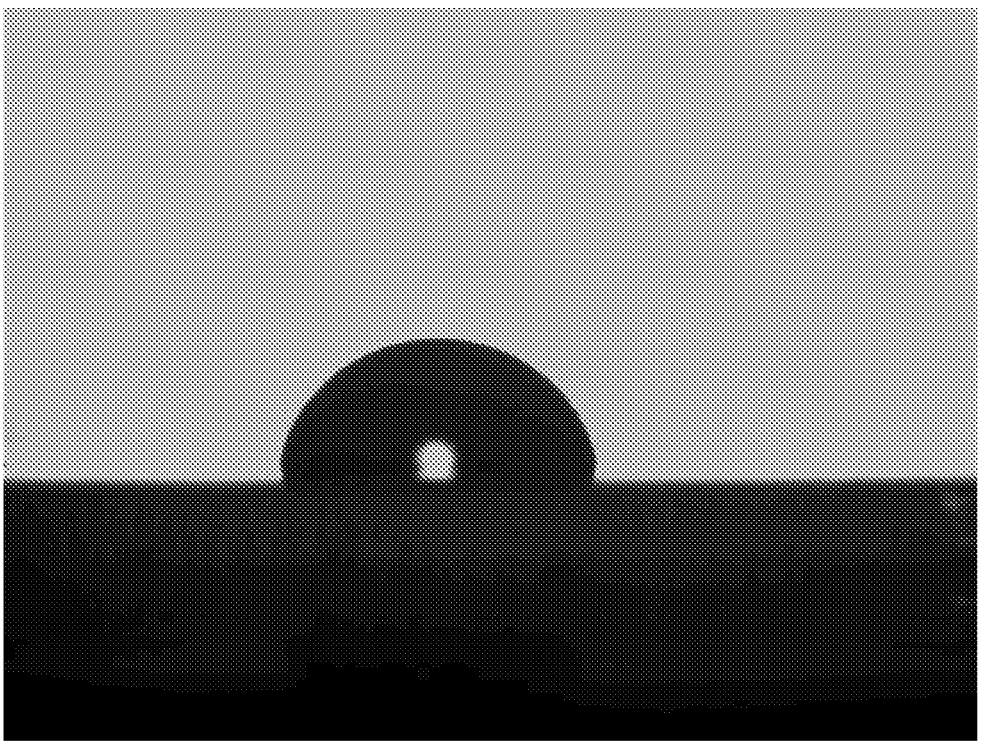

Water contact angle measurements showed that the film was superhydrophilic (less than 5°) as-grown (FIG. 7(A)). Water on film was shown to spread out completely on the film. As the film surface absorbs organics from the environment, the contact angle increases (FIG. 7(B)) but superhydrophilicity may be recovered by irradiation with UV light.

Figure 8:
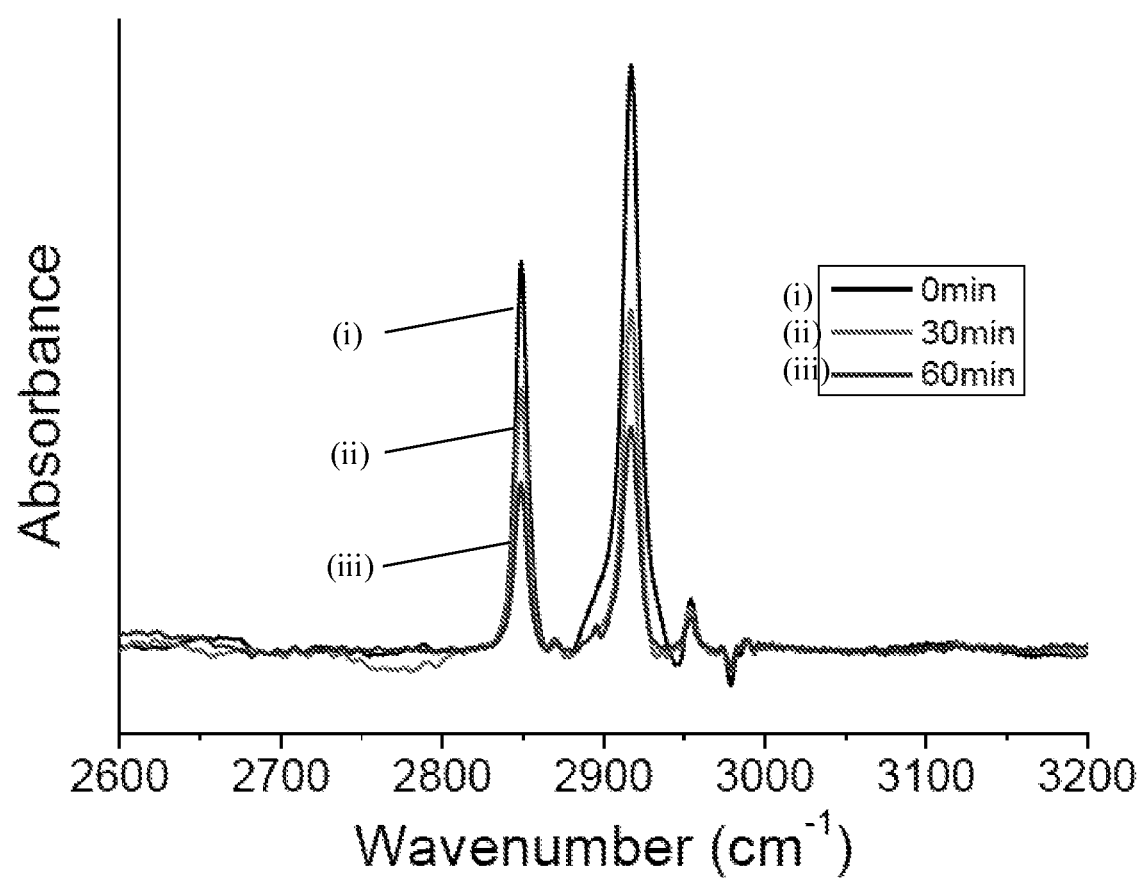
FIG. 8 is a graph depicting photodegradation of stearic acid at (i) 0 min; (ii) 30 min; and (iii) 60 min. Y-axis: absorbance; x-axis: wavenumber ($cm^{-1}$). As shown, the titanium oxide film was able to degrade stearic acid when irradiated with UV light, meaning that the titanium oxide film was photocatalytically active.

The film is photocatalytically active as shown by its ability to degrade stearic acid when UV is applied (FIG. 8).

Figure 9:
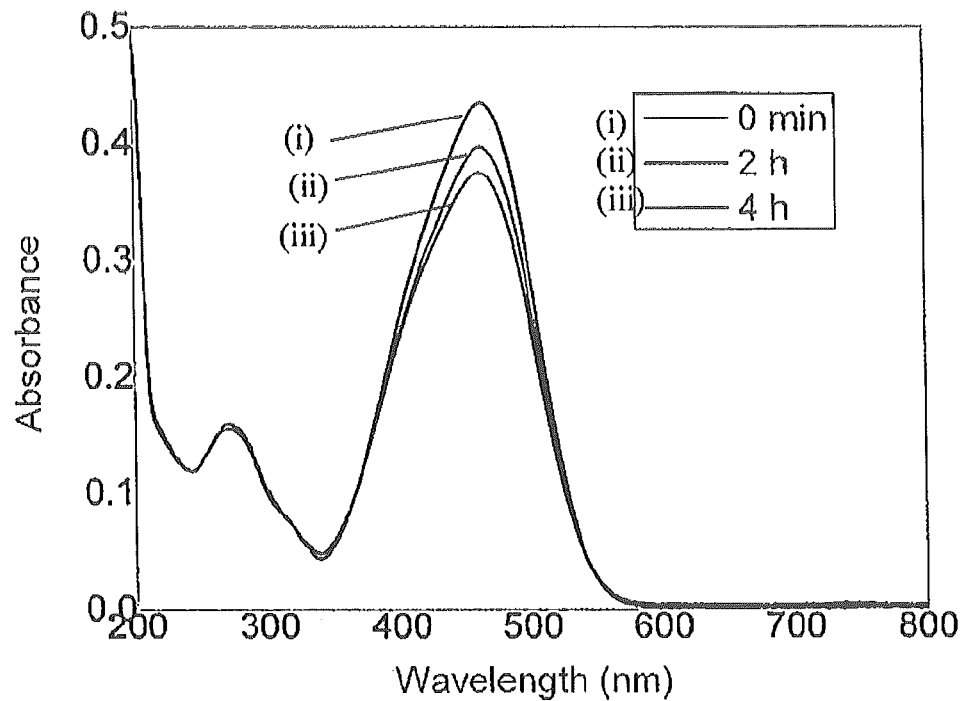
FIG. 9 shows photodegradation of a textile dye, methyl orange, upon irradiation with UV for (A) Pilkington Activ film after (i) 0 min, (ii) 2 hour, and (iii) 4 hour; and (B) TiOFOH film after (i) 0 hour; (ii) 2 hour; (iii) 4 hour, (iv) 6 hour, and (v) 8 hour. Y-axis: absorbance; x-axis: wavelength (nm). Result shows that TiOFOH film exhibited photocatalytical activity, and degraded textile dye faster than commercial Pilkington Activ film.
Figure 9:
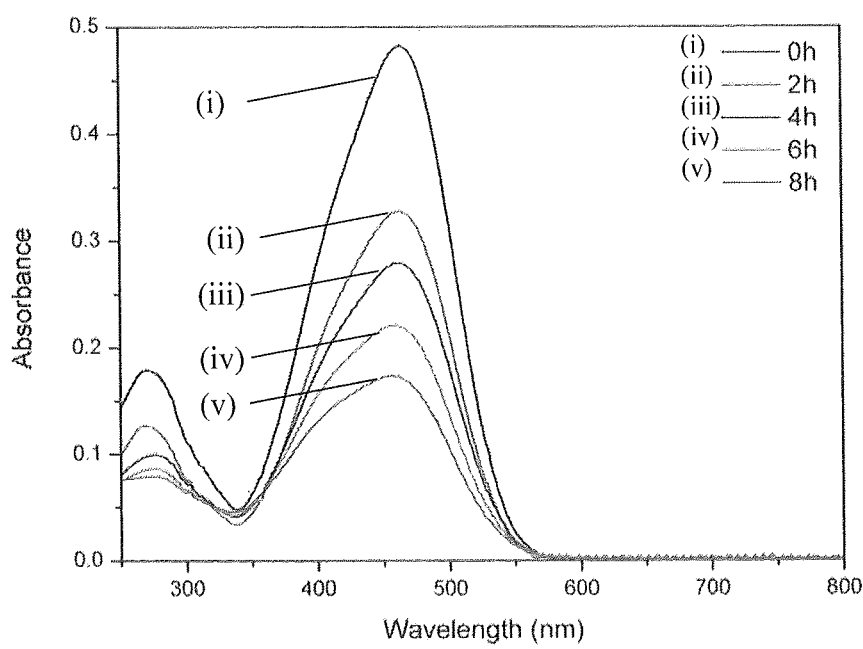

When compared to a commercial Pilkington Activ self cleaning anatase $TiO_2$ film (FIGS. 9(A) and (B)), the present film degrades the industrial dye methyl orange faster even though Pilkington Activ consists of a highly crystalline 40 nm layer of anatase. It is believed that although amorphous, the porous film has much greater surface area over which the photodegradation is able to take place.

The ultrawetting property or superhydrophilicity of the film may be used to form a coating that is anti-fogging and self cleaning. The photocatalytic activity of the film may be used to form a coating that is able to degrade organic compounds, odours and organic stains. The larger band-gap of the prepared films means that, upon irradiation of light through such a film, which may, for example, be coated on a window, there may still be sufficient UV radiation that has passed through the film to activate crystalline $TiO_2$ (band-gap about 3.2 eV) or ZnO (band-gap about 3 eV) that may be used or located inside a building.

The inventors have discovered that amorphous TiOFOH films grown by liquid phase deposition with certain parameters are not only superhydrophilic as-grown but also photocatalytically active, all the while remaining transparent.

In summary, the film disclosed herein is differentiated from state of the art $TiO_2$ films in that, while all reports of photocatalytically active $TiO_2$ deposited by LPD utilise crystalline forms, the film disclosed herein made by LPD is amorphous. Advantageously, the amorphous film may be superhydrophilic as-grown without any UV irradiation due to its mesoporous nature. This is evidenced by its much lower contact angle (less than 5°) as compared to that a previously reported titanium oxide film (66°). In addition, the present film is also active in degrading organic compounds such as stearic acid and methyl orange, i.e. the present film is photocatalytic.

Photocatalytic films may be formed at temperatures of less than 100° C., such as about 40° C. by low cost solution method as compared to greater than 600° C. for Pilkington Activ. Due to the low processing temperature, plastics and temperature sensitive substrates can be coated. There is low capital investment since sputtering or vacuum/controlled environment reactors are not required. Solution deposition means large area and uneven substrates and undercuts and porous bodies can be coated.

Films disclosed herein may be used for self cleaning and anti-fogging coatings, and anti-bacterial films.

Example 2: $SnO_2$ Film

According to various embodiments, transparent and doped tin oxide films may be grown by the liquid phase deposition (LPD) method at a temperature of not more than 100° C. The films disclosed herein are superhydrophilic (water contact angle less than 10°) as-grown without UV irradiation, which may be due to their porous structure. This contrasts with state of the art crystalline $SnO_2$ based films which have a rutile structure and which require irradiation with UV to confer superhydrophilicity on the films, i.e. the films are only superhydrophilic when irradiated with UV light. From the experiments carried out, it was also observed that application of UV radiation degrades organic compounds and so the films are photocatalytically active even when amorphous. This renders the films suitable for degrading odours and organic stains.

Example 2.1: Preparation of $SnO_2$ Film

Before deposition, glass substrates were first washed with piranha solution (3 $H_2SO_4$:1 $H_2O_2$) followed by rinsing with DI water. There are a variety of precursor solutions from which the film can be grown with. Examples include:

(i) aqueous solutions comprising 20 mM to 40 mM $(NH_4)_2SnF_6$ and 80 mM to 150 mM $H_3BO_3$ (60° C., 6 hours and above; 90° C., 4 hours and above);

(ii) aqueous solutions of 20 mM $SnF_2$ and 60 mM $H_3BO_3$ (60° C.; 16 hours and above);

(iii) aqueous solutions of 10 mM to 40 mM $SnF_2$ for 4 hours to 24 hours at 40° C. to 60° C.;

(iv) aqueous solutions of 10 mM to 40 mM $SnF_2$ with solution pH adjusted to 5 or 7 using 1 M NaOH for 4 to 24 hours at 40° C. to 60° C.

Film was formed at a growth temperature in the range of 40° C. to 70° C. growth temp.) according to the following equation:

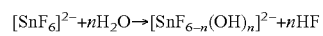

$$[SnF_6]^{2-} + nH_2O \rightarrow [SnF_{6-n}(OH)_n]^{2-} + nHF$$

Film deposition was carried out by liquid phase deposition at about a pH of about 3 using $(NH_4)_2SnF_6$ or $SnF_2$ (much cheaper) and $H_3BO_3$ (F scavenger) precursors. The film deposition may alternatively be carried out at a pH of about 7 i.e. neutral or near neutral conditions by using $SnF_2$ and NaOH, which means that a wider range of substrates, including substrates that are unstable in acidic solutions, may be used. This contrasts with state of the art $SnO_2$ films which require acidic solutions for formation. The method is simple and scalable.

To coat a substrate, the substrate was suspended horizontally in the growth solution, and then the container was sealed. The sealed container was then placed in a convection oven at various temperatures of less than 100° C. for varying periods. The resulting films were then washed with DI water and blown dry.

Example 2.2: Characterisation of $SnO_2$ Film

FIG. 10 shows the morphology of the films when grown at different temperatures and varying periods on glass. Scanning electron microscopy images (SEM) show that films were nanostructured and formed by an island growth mechanism.

In some embodiments, an $SiO_2$ layer was grown first on the substrate to improve properties of the tin oxide film grown subsequently. This buffer layer may be grown at 90° C. for 6 hours using 0.05 M $(NH_4)_2SiF_6$ and 0.15 M $H_3BO_3$.

Atomic force microscopy measurements of the film in FIG. 10(A) reveal a root mean square roughness, $V_{rms}$, of 11.2 nm. Ellipsometry was used to determine the thickness of films in FIGS. 10(A), (B), and (C) which were 78 nm, 100 nm, and 94 nm respectively.

X-ray diffraction shows that the as-grown films are all amorphous while transmittance measurements (see FIG. 11(A)) show that the as-grown films are transparent. As shown in FIG. 11(B), optical band-gap measurements reveal an indirect band-gap of 3.6 eV.

X-ray photoelectron spectroscopy (XPS) in FIG. 12 revealed that the film also contained F other than Sn and O, indicating that it was a fluorine doped tin oxide (FTO) film. The atomic percentages for Sn, O and F were found to be 31.2%, 65.2%, and 4.4% respectively.

Water contact angle measurements showed that the films were superhydrophilic (less than 10°) as-grown under various conditions (TABLE 1).

TABLE 1

Variation of water contact angles (°) with time.

|        | As-grown | 2 weeks | 1 month | After UV (254 nm) treatment |
|--------|----------|---------|---------|-----------------------------|
| Film 1 | 6-8      | 24      | 29      | <5                          |
| Film 2 | 5        | 5       | 9.5     | <5                          |
| Film 3 | <5       | 9       | 21      | <5                          |

Film 1: F doped tin oxide film grown at 60° C. for 6 hours with 20 mM $(NH_4)_2SnF_6$ and 80 mM $H_3BO_3$ precursor solution on glass.
Film 2: F doped tin oxide film grown at 60° C. for 6 hours with 20 mM $(NH_4)_2SnF_6$ and 80 mM $H_3BO_3$ precursor solution on $SiO_2$ buffered glass.
Film 3: F doped tin oxide film grown at 60° C. for 6 hours with 40 mM $(NH_4)_2SnF_6$ and 150 mM $H_3BO_3$ precursor solution on $SiO_2$ buffered PC.

As the film surface absorbs organics from the environment with time, the contact angle increases but superhydrophilicity may be recovered by irradiation with UV light. This suggests that the films were photocatalytically active, an unexpected result given that the films are amorphous.

FIG. 13 is a graph showing photodegradation of methyl orange by the amorphous film in FIG. 10(A) upon UV activation. In other words, UV radiation activated photocatalytic properties of $SnO_2$ film and degraded methyl orange dye. In so doing, the $SnO_2$ film may be rendered superhydrophilic again.

It was also noted that one or more $SiO_2$ buffer layers grown between the doped tin oxide film and the substrate improved the properties such as superhydrophilic performance of the subsequently grown tin oxide coatings. This $SiO_2$ buffer layer was grown on glass using 0.05 M $(NH_4)SiF_6$ and 0.15 M $H_3BO_3$ at 60° C. for 6 hours while on polycarbonate (PC) it was 0.1 M $(NH_4)SiF_6$ and 0.3 M $H_3BO_3$ at 90° C. for 2 hours. Growth of tin oxide on both glass and PC were subsequently carried out at 60° C. for 6 hours.

In order to grow the tin oxide films on PC, the substrate was first cleaned with HCl solution (pH 2) for 2 minutes to 5 minutes at room temperature. This was followed by cleaning with DI water, and subsequent blow drying. After blow drying, the PC substrate was immersed in 1.0 vol % 3-aminopropyltriethoxysilane (APTES) in isopropanol for 10 minutes to modify the surface with APTES. Then the PC pieces were taken out and rinsed with isopropanol. Finally, they were baked at 100° C. for 5 minutes. This treated PC was then used to grow doped tin oxide films or $SiO_2$ buffer layers followed by doped tin oxide.

The refractive index of the doped tin oxide film was also determined by ellipsometry, as shown in FIG. 14. Normally F doped tin oxide has a refractive index of about 2 at a wavelength of 550 nm but the present film has a refractive index of about 1.43, very close to that of glass which is about 1.5. $TiO_2$ films have refractive indices about 2.5 while the TiOFOH film has a refractive index of 1.8. This index matching feature means that doped tin oxide films will not give a tint to glass substrates it is grown on and/or there is no fringing effect. Advantageously, this provides flexibility in architectural design. The lower refractive index of the presently grown doped tin oxide films is probably due to their porous and amorphous nature.

The film may also be grown using aqueous solutions of $SnF_2$, and aqueous solutions of $SnF_2$ with $H_3BO_3$. Aqueous solutions of 40 mM $SnF_2$ have an acidic pH of 3. By adding NaOH, the pH may be raised closer to neutral (pH 7) and a superhydrophilic film (less than 10°) may still be formed. This chemistry may be useful when growing on substrates that are less stable in acidic environments.

Interestingly, films grown under some conditions that are not superhydrophilic as-grown become superhydrophilic (less than 10°) after heat treatment. For example, films grown at 60° C. for 16 hours using 40 mM aqueous solutions of $SnF_2$ have an as-deposited contact angle of 14° which decreases to 6° after annealing at 550° C. in air. This was also observed for films grown at 50° C. for 24 hours using 40 mM $SnF_2$ and NaOH to adjust the pH to 7 (20.8° to 7°).

As demonstrated herein, photocatalytic films may be formed at temperatures of less than 100° C. by low cost solution method, as compared to that for Pilkington Activ where temperatures of greater than 600° C. are used. Due to the low processing temperatures, plastics and temperature sensitive substrates may be coated. The method of preparing the film is simple and scalable involving only low capital investment, since sputtering or vacuum/controlled environment reactors are not required. The use of solution deposition also means that substrates with large areas and/or uneven surfaces, as well as substrates having undercuts and/or porous bodies may be coated.

There are no prior report of the use of amorphous FTO films for photocatalyses. The as-grown F-doped thin oxide (FTO) films are superhydrophilic, and no UV activation is required. FTO film as presently disclosed has lower refractive index. LPD growth of FTO film may be carried out at a pH of about 7, in contrast to growth of films using LPD which are carried out in acidic regime. As also demonstrated herein, use of LPD $SiO_2$ film as buffer layer improves properties.

Exemplary applications of films include self cleaning and anti-fogging coatings for buildings and automotive, and transparent conducting films.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method for preparing an amorphous metal oxide film which is superhydrophilic as-grown without requiring activation by UV excitation, the method comprising:
    a) providing an aqueous composition comprising a metal fluorine compound; and
    b) contacting a substrate with the aqueous composition at a temperature of less than about 100° C. and for a suitable time period to form metal oxide islands on the substrate, wherein the metal oxide islands are spaced apart from each other to form spacings between the metal oxide islands, and the spacings between the metal oxide islands form mesopores in the amorphous metal oxide film.

2. The method according to claim 1, wherein the metal oxide film is a fluorine-doped metal oxide film and/or a fluorine-doped metal oxide hydroxide film.

3. The method according to claim 1, wherein the metal fluorine compound is $MF_2$, $ME_4$, or a metal fluorine complex having general formula $A_2MF_6$, wherein M is independently selected from the group consisting of Ti, Sn, and alloys thereof, and A is selected from the group consisting of an ammonium group, hydrogen, alkali metal, coordinated water, and combinations thereof.

4. The method according to claim 1, wherein the metal fluorine compound is selected from the group consisting of $SnF_2$, $SnF_4$, $(NH_4)_2TiF_6$, $(NH_4)_2SnF_6$, $TiF_4$, $H_2TiF_6$, $H_2SnF_6$, and combinations thereof.

5. The method according to claim 1, wherein concentration of metal fluorine compound in the aqueous composition is in the range of about 0.01 M to about 0.1 M.

6. The method according to claim 1, wherein the metal fluorine compound comprises $SnF_2$.

7. The method according to claim 6, wherein the aqueous composition further comprises an alkaline solution, and pH of the aqueous composition comprising the alkaline solution is in the range of about 5 to about 7.

8. The method according to claim 1, wherein the aqueous composition further comprises a fluorine scavenger.

9. The method according to claim 8, wherein the fluorine scavenger is selected from the group consisting of boric acid, alkali metal borate, ammonium borate, boron anhydride, boron monoxide, aluminum chloride, sodium hydroxide, aqueous ammonia, metallic aluminum, aluminum oxide, and combinations thereof.

10. The method according to claim 8, wherein the fluorine scavenger comprises boric acid.

11. The method according to claim 8, wherein concentration of fluorine scavenger in the aqueous composition is in the range of about 0.06 M to about 0.3 M.

12. The method according to claim 1, wherein contacting the substrate with the aqueous composition is carried out at a temperature in the range of about 40° C. to about 60° C.

13. The method according to claim 1, wherein the substrate comprises a silicon oxide layer.

14. The method according to claim 13, wherein the substrate comprising the silicon oxide layer is obtained by contacting a substrate with an aqueous composition comprising $(NH_4)_2SiF_6$ and boric acid at a temperature of less than 100° C.

15. The method according to claim 1, wherein the amorphous metal oxide film is photocatalytically active.

16. The method according to claim 1, wherein optical band-gap of the amorphous metal oxide film is greater than 3.2 eV.

17. An amorphous metal oxide film which is superhydrophilic as-grown without requiring activation by UV excitation prepared by a method comprising:
   a) providing an aqueous composition comprising a metal fluorine compound; and
   b) contacting a substrate with the aqueous composition at a temperature of less than about 100° C. and for a suitable time period to form metal oxide islands on the substrate, wherein the metal oxide islands are spaced apart from each other to form spacings between the metal oxide islands, and the spacings between the metal oxide islands form mesopores in the amorphous metal oxide film to obtain said amorphous metal oxide film on the substrate.

* * * * *